United States Patent
Nakamura et al.

(10) Patent No.: US 6,456,381 B1
(45) Date of Patent: Sep. 24, 2002

(54) APPARATUS FOR AND METHOD OF USING OPTICAL INTERFERENCE OF LIGHT PROPAGATING THROUGH AN OPTICAL FIBER LOOP

(75) Inventors: Yasushi Nakamura; Yoshiharu Unami; Shinichi Niimi, all of Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/299,580

(22) Filed: Apr. 27, 1999

(30) Foreign Application Priority Data

Apr. 28, 1998 (JP) .......................... 10-119565
May 13, 1998 (JP) .......................... 10-130846
May 28, 1998 (JP) .......................... 10-147635

(51) Int. Cl.$^7$ ................................ G01B 9/02
(52) U.S. Cl. ........................ 356/483; 385/12
(58) Field of Search .................... 356/483; 385/12, 385/24; 359/577, 578

(56) References Cited

U.S. PATENT DOCUMENTS 4,375,680 A * 3/1983 Cahill et al. ............... 367/149
4,536,861 A    8/1985 Graindorge et al.
5,355,208 A    10/1994 Crawford et al.
5,379,357 A * 1/1995 Sentsui et al. .............. 385/11

FOREIGN PATENT DOCUMENTS

DE    3039235 A1    5/1982
JP    5-346598      12/1993

* cited by examiner

Primary Examiner—Frank G. Font
Assistant Examiner—Phil Natividad
(74) Attorney, Agent, or Firm—Sughrue Mion, PLLC

(57) ABSTRACT

A signal/vibration detecting technique employs a simple structure to identify a target optical fiber among many and carry out a bidirectional conversation through the target optical fiber. First ends of optical fibers (202A, 202B), one of which is a target optical fiber, are connected to an optical transceiver (201). Second ends of the optical fibers are connected to each other to form a loop. A local unit (203) is installed at the loop. The local unit vibrates the loop, and the optical transceiver emits lights so that the lights are oppositely propagated through the loop. The propagated lights are coupled together so that they interfere with each other. In the intensity of the interfering lights, a change corresponding to the vibration is detected to identify the target optical fiber. Once the target optical fiber is identified, it is used to carry out a conversation between the optical transceiver and the local unit.

6 Claims, 21 Drawing Sheets

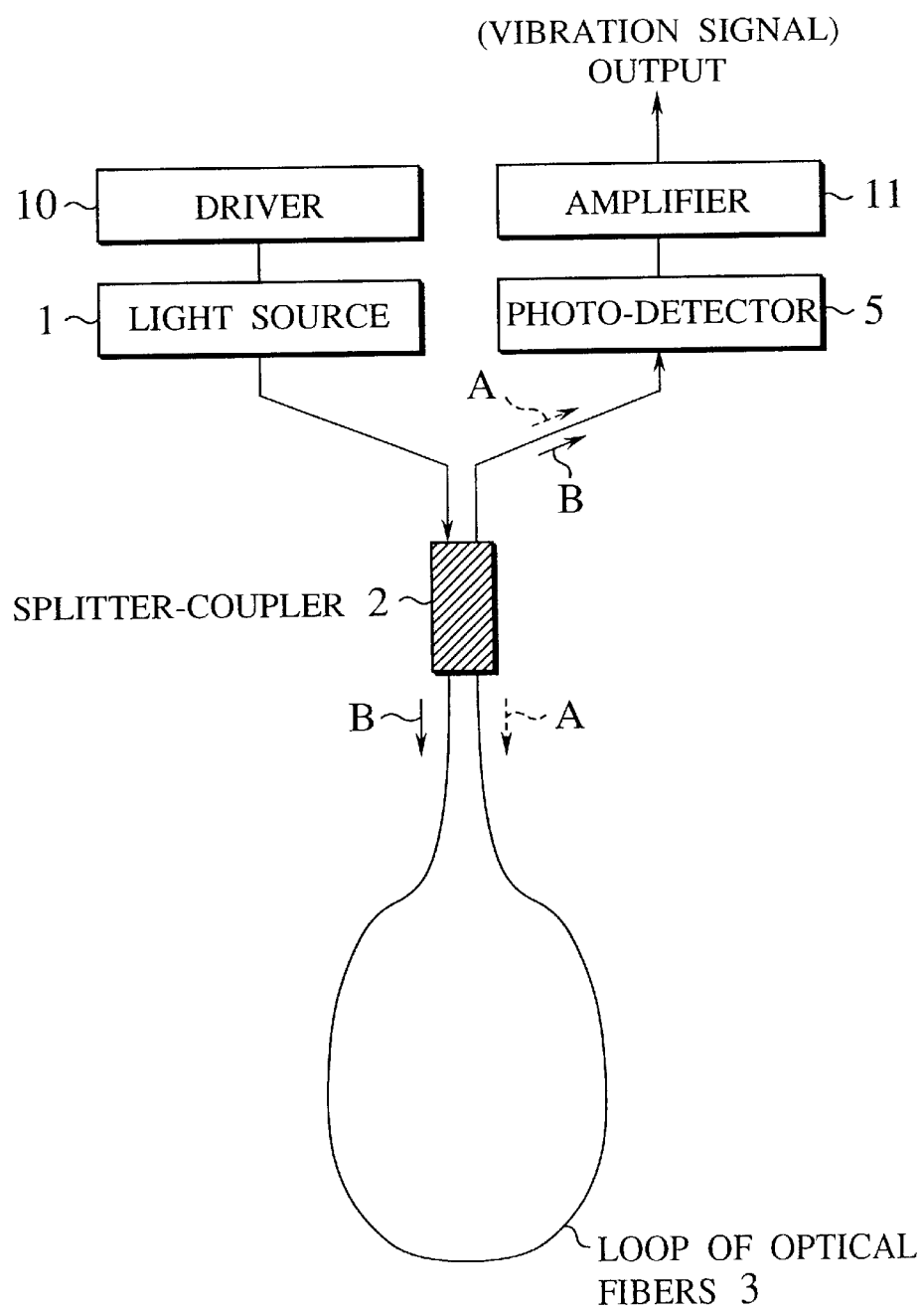

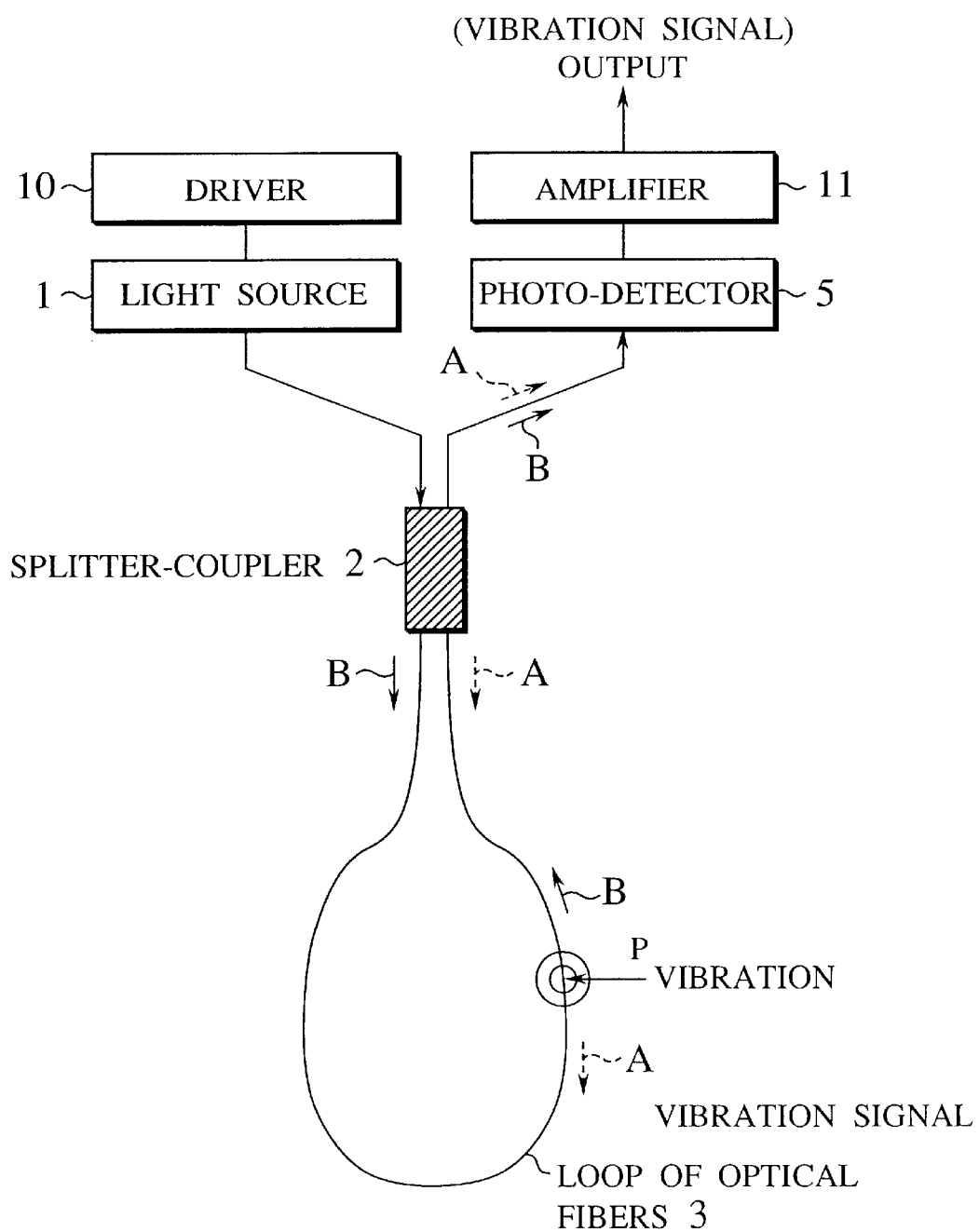

PHASE SHIFT AT P

PHASE SHIFT IN LIGHTS A
AND B AT PHOTODIODE 2

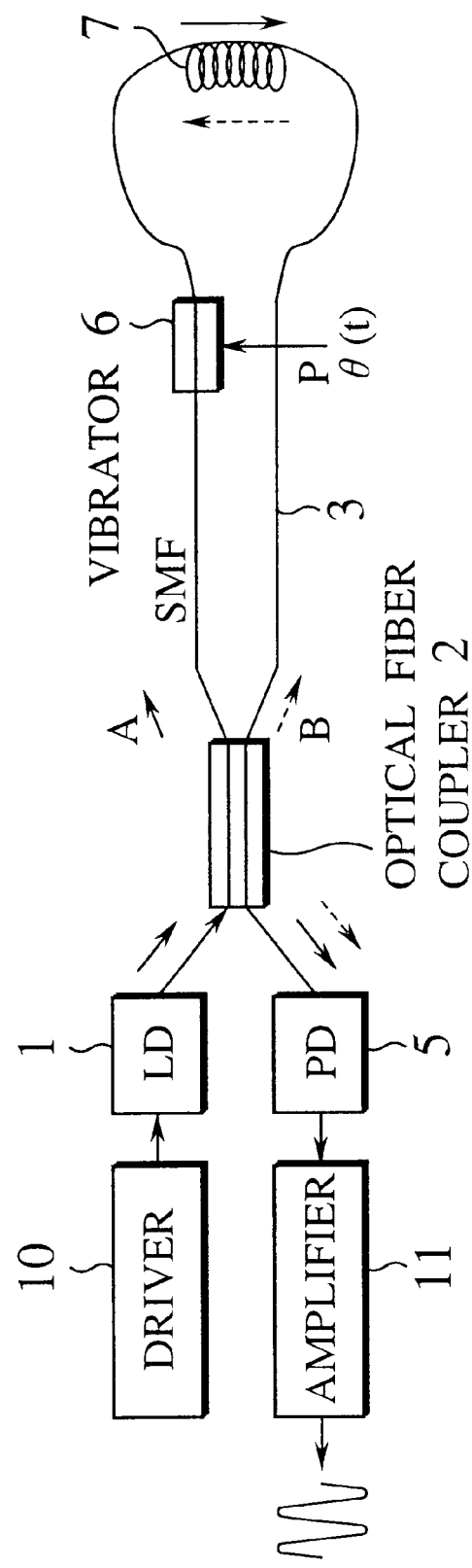

APPARATUS FOR AND METHOD OF USING OPTICAL INTERFERENCE OF LIGHT PROPAGATING THROUGH AN OPTICAL FIBER LOOP

BACKGROUND OF THE INVENTION

1. Field of the Invention

The present invention relates to a signal/vibration detecting technique employing optical interference. The technique emits lights into open ends of a loop made of a plurality of optical fibers so that the lights are propagated clockwise and counterclockwise, respectively, through the loop, couples the propagated lights together so that they interfere with each other, and detects a physical change such as vibration applied to the loop by observing a change in the intensity of the interfering lights.

The present invention also relates to a technique of applying the signal/vibration detecting technique to identify a target optical fiber cable among many during, for example, cable changing and removing work.

The present invention also relates to a technique of applying the signal/vibration detecting technique to identify a target optical fiber among optical fibers contained in a cable and use the identified target optical fiber to carry out a conversation without cutting the optical fiber.

2. Description of the Prior Art

Various sensors and detectors that use optical interference caused on optical fibers and lasers have been proposed. For example, a Mach-Zhehnder interferometer emits a laser light from a light source, splits the laser light into two so that the two split lights pass through two optical paths, couples the lights so that they interfere with each other, and detects a phase shift between the lights according to a change in interference fringes.

This technique is applicable to provide a simple structure consisting of a laser and a loop made of a plurality of optical fibers to detect a physical change such as vibration applied to the loop.

The technique is also applicable to identify a target optical fiber cable among many, or identify a target optical fiber among optical fibers contained in a cable and carry out a conversation through the target optical fiber.

This technique is applicable to changing and removing work of optical fiber cables in a telephone tunnel or a manhole. During such work, the technique is used to identify a target optical fiber cable among many cables so that erroneous cables may not be cut. When changing an optical fiber to another in a given cable, the technique is used to identify the target optical fiber among many optical fibers contained in the cable.

To identify a target optical fiber cable, a prior art emits a light into an end of the cable, applies ultrasonic waves to the cable, monitors polarization of the light propagated through the cable influenced by the ultrasonic waves, and identifies the cable.

Another prior art emits a light from a light source and splits it into two by an optical coupler. The split lights are made incident to two different optical fibers contained in a target optical fiber cable. The split lights are propagated through the optical fibers, are coupled together by an optical coupler at the other end of the cable, and are received by a photo-detector. Vibration is applied to the cable. The vibration causes stress on the cable to change the lengths of optical paths through which the split lights are propagated. This changes a phase difference and polarization plane between the propagated lights, thereby changing the intensity of interference of the coupled lights at the end of the cable. According to this change, the cable is identified even if it is laid among many cables.

These prior arts are applicable to identify a target optical fiber among optical fibers contained in a cable.

The prior arts mentioned above must change polarization planes to identify a target optical fiber cable or a target optical fiber. If there is an outside factor to change polarization planes, the prior arts are unable to correctly identify the target cable or fiber. As a result, the prior arts achieve only a poor probability of 70% in identifying a target cable or fiber. This probability will further deteriorates depending on the material of a target cable or fiber. In addition, the prior arts require expensive devices.

The prior arts malfunction when the difference between the lengths of two optical fibers for propagating lights exceeds a coherent length. The prior arts need an additional optical coupler be installed at the receiver side of a cable, and if lights propagated through two optical fibers in the cable are polarized orthogonally, do not work because no interference occurs between the propagated lights.

On the other hand, the signal/vibration detecting technique of the present invention employs a simple, low-cost structure to surely identify a target optical fiber cable or a target optical fiber.

A target optical fiber identified according to any one of the techniques mentioned above can be used without being cut to carry out a conversation between distant work sites during cable/fiber changing and removing work.

To achieve such conversation, a prior art bends the target optical fiber to cause a loss, changes the radius of the bend, and uses brightness modulation due to the radius change. Another prior art distorts the optical fiber and uses a change in polarization of the optical fiber due to the distortion.

The prior art using brightness modulation applies vibration with, for example, a speaker to the optical fiber to change the radius of the bend formed on the optical fiber. The change in the radius changes a loss to change brightness, thereby modulating a light passed through the optical fiber. This technique is employed by an optical conversation method disclosed in Japanese Unexamined Patent Publication No. 4-368629 and by an optical fiber bend setting method for an optical fiber conversation apparatus disclosed in Japanese Unexamined Patent Publication No. 5-264909.

Japanese Unexamined Patent Publication No. 7-38502 discloses an optical fiber conversation apparatus that makes lights enter into and exit from the side of an optical fiber. A transmitter emits a light from a light source, modulates the brightness of the light, and makes the light incident to a bend of the optical fiber. A receiver converts leakage lights from a bend of the optical fiber into an electric signal.

The technique of the Japanese Unexamined Patent Publication No. 4-368029 vibrates a bend of an optical fiber to change the brightness of a light, thereby modulating the light. The degree of modulation of this technique is 9%, which is very low, and therefore, must be compensated. In addition, vibrating an optical fiber needs a complicated mechanism to increase the size and cost of the technique.

The technique of the Japanese Unexamined Patent Publication No. 7-38502 makes a light enter into and exit from the side of an optical fiber, to cause large optical coupling losses. As a result, this technique is unable to realize a large dynamic range and clear conversation.

The technique of changing polarization planes by ultrasonic waves is unable to secure a conversation if external factors make the polarization planes orthogonal to each other.

On the other hand, the signal/vibration detecting technique of the present invention employs a simple, inexpensive structure to improve the degree of modulation and reduce mechanical load on an optical fiber that is used for conversation.

SUMMARY OF THE INVENTION

An object of the present invention is to provide a signal/vibration detecting technique employing optical interference and a simple structure made of a laser and a loop of a plurality of optical fibers.

Another object of the present invention is to provide a technique of identifying a target optical fiber cable among many with the use of the signal/vibration detecting technique employing optical interference and a simple, inexpensive apparatus.

Still another object of the present invention is to provide a technique of identifying a target optical fiber among many and using the identified optical fiber to carry out a conversation at an improved degree of modulation and reduced load on the optical fiber, with the use of the signal/vibration detecting technique.

In order to accomplish the objects, a first aspect of the present invention provides an apparatus for detecting a signal based on optical interference, having a light source, a photo-detector, a loop made of a plurality of optical fibers and having open ends, and a splitter-coupler connected to the open ends of the loop. The light source emits a light, which is split by the splitter-coupler. The split lights are made incident to the open ends of the loop, respectively, so that the split lights are oppositely propagated through the loop. The oppositely propagated lights are coupled by the splitter-coupler so that they interfere with each other. The interfering lights are converted by the photo-detector into a signal that indicates the intensity of the interfering lights and is responsive to a change in the phase difference between the lights.

According to the signal from the photo-detector, the first aspect detects a physical change applied to the loop and changed the phase difference between the oppositely propagated lights.

A second aspect of the present invention provides a method of detecting a signal based on optical interference, including the steps of emitting a light from a light source, splitting the light by a splitter-coupler, making the split lights incident to open ends of a loop made of a plurality of optical fibers so that the split lights are oppositely propagated through the loop, coupling the propagated lights by the splitter-coupler so that they interfere with each other, converting the interfering lights by a photo-detector into a signal that indicates the intensity of the interfering lights and is responsive to a change in the phase difference between the lights, and detecting, according to the signal from the photo-detector, a physical change applied to the loop and changed the phase difference between the lights.

A third aspect of the present invention adds, to the method of the second aspect, the step of inserting a delay unit in the loop or between the loop and the splitter-coupler, to delay the lights propagated through the loop.

Even if being applied to the midpoint of the loop, the physical change surely causes, due to the delay unit, a phase difference between the lights oppositely propagated through the loop, and therefore, is surely detectable according to the signal provided by the photo-detector.

A fourth aspect of the present invention provides an apparatus for detecting vibration based on optical interference, having a light source, a photo-detector, a loop made of a plurality of optical fibers and having open ends, and a splitter-coupler connected to the open ends of the loop. The light source emits a light, which is split by the splitter-coupler. The split lights are made incident to the open ends of the loop, respectively, so that the split lights are oppositely propagated through the loop. The oppositely propagated lights are coupled by the splitter-coupler so that they interfere with each other. The interfering lights are converted by the photo-detector into a signal that indicates the intensity of the interfering lights and is responsive to a change in the phase difference between the lights caused by vibration applied to the loop.

According to the signal from the photo-detector, the fourth aspect detects a physical change, i.e., vibration applied to the loop and changed the phase difference between the oppositely propagated lights.

A fifth aspect of the present invention provides a method of detecting vibration based on optical interference, including the steps of emitting a light from a light source, splitting the light by a splitter-coupler, making the split lights incident to open ends of a loop made of a plurality of optical fibers so that the split lights are oppositely propagated through the loop, coupling the oppositely propagated lights by the splitter-coupler so that they interfere with each other, converting the interfering lights by a photo-detector into a signal that indicates the intensity of the interfering lights and is responsive to a change in the phase difference between the lights, and detecting, according to the signal from the photo-detector, vibration applied to the loop and changed the phase difference between the lights.

A sixth aspect of the present invention adds, to the method of the fifth aspect, the step of inserting a delay unit in the loop or between the loop and the splitter-coupler, to delay the lights oppositely propagated through the loop.

Even if being applied to the midpoint of the loop, the vibration surely causes, due to the delay unit, a phase difference between the lights oppositely propagated through the loop, and therefore, is surely detectable according to the signal from the photo-detector.

A seventh aspect of the present invention provides an apparatus for identifying a target optical fiber cable among many, having a light source, a photo-detector, a loop made of a plurality of optical fibers and having open ends, and a splitter-coupler. The splitter-coupler is connected to the light source, the photo-detector, and the open ends of the loop. The light source emits a light. The splitter-coupler receives the light, splits the light, makes the split lights incident to the open ends of the loop, respectively, so that the split lights are oppositely propagated through the loop, receives the oppositely propagated lights, couples the received lights so that they interfere with each other, and supplies the interfering lights to the photo-detector. The photo-detector converts the interfering lights into an electric signal that indicates the intensity of the interfering lights and is responsive to a change in the phase difference between the lights. According to the electric signal, the seventh aspect detects a physical change applied to the target optical fiber cable that contains at least a part of the loop.

An eighth aspect of the present invention provides an apparatus for identifying a target optical fiber cable among many, having a light source, a photo-detector, a loop made of a plurality of optical fibers and having open ends, and a splitter-coupler. The splitter-coupler is connected to the light source, the photo-detector, and the open ends of the loop. The light source emits a light, which is received by the splitter-coupler. The splitter-coupler splits the light, makes the split lights incident to the open ends of the loop, respectively, so that the split lights are oppositely propagated through the loop, receives the oppositely propagated lights, couples the received lights so that they interfere with each other, and supplies the interfering lights to the photo-detector. The photo-detector converts the interfering lights into an electric signal that indicates the intensity of the interfering lights and is responsive to a change in the phase difference between the lights. According to the electric signal, the eighth aspect detects vibration applied to the target optical fiber cable that contains at least a part of the loop.

A ninth aspect of the present invention provides an apparatus for identifying a target optical fiber cable among many, having an optical transceiver connected to open ends of a loop made of a plurality of optical fibers and a local unit for applying vibration to loop. The optical transceiver has a light source for emitting a light, a splitter-coupler for splitting the light, making the split lights incident to the open ends of the loop, respectively, so that the lights are oppositely propagated through the loop, receiving the oppositely propagated lights, and coupling the received lights so that they interfere with each other, and a photo-detector for converting the interfering lights into an electric signal. This electric signal indicates the intensity of the interfering lights, is responsive to a change in the phase difference between the lights caused by the vibration applied to the loop, and is used to identify the target optical fiber cable that contains at least a part of the loop.

Any one of the seventh to ninth aspects of the present invention picks up a plurality of optical fibers in a target optical fiber cable, or at least one of them in a target optical fiber cable and others in another optical fiber cable. Each end of the picked-up optical fibers is connected to each other into a loop having two open ends.

The light source emits a light. The splitter-coupler splits the light and makes the split lights incident to the open ends of the loop, respectively, so that the lights are oppositely propagated through the loop. The oppositely propagated lights are received and coupled by the splitter-coupler to that they interfere with each other. The interfering lights are supplied to the photo-detector.

Under this state, the local unit applies a physical change, which may be pressure, bend, tension, or vibration, to optical fiber cables including the target cable one after another.

The photo-detector converts the interfering lights from the splitter-coupler into an electric signal that indicates the intensity of the interfering lights and is responsive to a change in the phase difference between the lights. When the local unit applies the physical change to the target optical fiber cable that contains at least a part of the loop, the signal from the photo-detector shows a change corresponding to the physical change. As a result, one can identify the target optical fiber cable among many cables.

A tenth aspect of the present invention provides a method of identifying a target optical fiber cable among many, including the steps of connecting each end of a plurality of optical fibers to each other to form a loop having two open ends, connecting an optical transceiver to the open ends of the loop, emitting a light from a light source of the optical transceiver, splitting the light by a splitter-coupler of the optical transceiver, making the split lights incident to the open ends of the loop, respectively, so that the split lights are oppositely propagated through the loop, coupling the oppositely propagated lights so that they interfere with each other, converting the interfering lights by a photo-detector of the optical transceiver into an electric signal that indicates the intensity of the interfering lights and is responsive to a change in the phase difference between the lights, and detecting in the electric signal a physical change applied to the target-optical fiber cable that contains at least a part of the loop.

An eleventh aspect of the present invention provides a method of identifying a target optical fiber cable among many, including the steps of connecting each end of a plurality of optical fibers to each other to form a loop having two open ends, connecting an optical transceiver to the open ends of the loop, emitting a light from a light source of the optical transceiver, splitting the light by a splitter-coupler of the optical transceiver, making the split lights incident to the open ends of the loop, respectively, so that the split lights are oppositely propagated through the loop, coupling the oppositely propagated lights so that they interfere with each other, converting the interfering lights by a photo-detector of the optical transceiver into an electric signal that indicates the intensity of the interfering lights and is responsive to a change in the phase difference between the lights, and detecting, in the electric signal, vibration applied to the target optical fiber cable that contains at least a part of the loop.

A twelfth aspect of the present invention adds, to any one of the tenth and eleventh aspects, the step of inserting a delay unit in the loop or between the loop and the optical transceiver, to delay the lights oppositely propagated through the loop.

Even if being applied to the midpoint of the loop, the physical change or vibration surely causes a phase difference between the lights oppositely propagated through the loop, and therefore, is surely detectable according to the signal from the photo-detector.

A thirteenth aspect of the present invention provides an apparatus for identifying a target optical fiber among many, having a light source, a photo-detector, a loop made of a plurality of optical fibers and having open ends, and a splitter-coupler. The splitter-coupler is connected to the light source, the photo-detector, and the open ends of the loop made of the a plurality of optical fibers including the target optical fiber. The light source emits a light. The splitter-coupler splits the light, makes the split lights incident to the open ends of the loop, respectively, so that the split lights are oppositely propagated through the loop, receives the oppositely propagated lights, couples the received lights so that they interfere with each other, and supplies the interfering lights to the photo-detector. The photo-detector converts the interfering lights into an electric signal that indicates the intensity of the interfering lights and is responsive to a change in the phase difference between the lights. According to the electric signal, the thirteenth aspect detects a physical change applied to loop.

A fourteenth aspect of the present invention provides an apparatus for identifying a target optical fiber among many, having a light source, a photo-detector, a loop made of a plurality of optical fibers and having open ends, and a splitter-coupler. The splitter-coupler is connected to the light source, the photo-detector, and the open ends of the loop made of the a plurality of optical fibers including the target optical fiber. The light source emits a light. The splitter-coupler splits the light, makes the split lights incident to the open ends of the loop, respectively, so that the split lights are oppositely propagated through the loop, receives the oppositely propagated lights, couples the received lights so that they interfere with each other, and supplies the interfering lights to the photo-detector. The photo-detector converts the interfering lights into an electric signal that indicates the intensity of the interfering lights and is responsive to a change in the phase difference between the lights. According to the electric signal, the fourteenth aspect detects vibration applied to the loop.

A fifteenth aspect of the present invention provides an apparatus for identifying a target optical fiber among many, having an optical transceiver and a local unit. The optical transceiver is connected to open ends of a loop made of a plurality of optical fibers including the target optical fiber. The local unit applies vibration to the loop. The optical transceiver has a light source for emitting a light, a splitter-coupler for splitting the light, making the split lights incident to the open ends of the loop, respectively, so that the lights are oppositely propagated through the loop, receiving the oppositely propagated lights, and coupling the received lights so that they interfere with each other, and a photo-detector for converting the interfering lights into an electric signal. The electric signal indicates the intensity of the interfering lights, is responsive to a change in the phase difference between the lights caused by the vibration applied to the loop, and is used to identify the target optical fiber.

Any one of the thirteenth to fifteenth aspects of the present invention picks up a target optical fiber and another optical fiber in a given cable, connects one ends of the picked-up optical fibers to each other through an optical connector to form a loop having two open ends. The light source emits a light. The splitter-coupler splits the light and makes the split lights incident to the open ends of the loop, respectively, so that the split lights are oppositely propagated through the loop. The oppositely propagated lights are received and coupled by the splitter-coupler so that they interfere with each other. The interfering lights are supplied to the photo-detector.

Under this state, the local unit applies a physical change, which may be pressure, bend, tension, or vibration, to optical fibers in the cable one after another.

The photo-detector converts the interfering lights into an electric signal that indicates the intensity of the interfering lights. When the local unit applies the physical change to the target optical fiber, the signal from the photo-detector shows a change corresponding to the physical change. As a result, one can identify the target optical fiber.

A sixteenth aspect of the present invention provides a method of identifying a target optical fiber among many, including the steps of connecting each end of a plurality of optical fibers including the target optical fiber to each other to form a loop having two open ends, connecting an optical transceiver to the open ends of the loop, emitting a light from a light source of the optical transceiver, splitting the light by a splitter-coupler of the optical transceiver, making the split lights incident to the open ends of the loop, respectively, so that the split lights are oppositely propagated through the loop, coupling the oppositely propagated lights so that they interfere with each other, converting the interfering lights by a photo-detector of the optical transceiver into an electric signal that indicates the intensity of the interfering lights and is responsive to a change in the phase difference between the lights, and detecting in the electric signal a physical change applied to the loop.

A seventeenth aspect of the present invention provides a method of identifying a target optical fiber among many, including the steps of connecting each end of a plurality of optical fibers including the target optical fiber to each other to form a loop having two open ends, connecting an optical transceiver to the open ends of the loop, emitting a light from a light source of the optical transceiver, splitting the light by a splitter-coupler of the optical transceiver, making the split lights incident to the open ends of the loop, respectively, so that the split lights are oppositely propagated through the loop, coupling the oppositely propagated lights so that they interfere with each other, converting the interfering lights by a photo-detector of the optical transceiver into an electric signal that indicates the intensity of the interfering lights and is responsive to a change in the phase difference between the lights, and detecting, in the electric signal, vibration applied to the loop.

An eighteenth aspect of the present invention adds, to any one of the sixteenth and seventeenth aspects, the step of inserting a delay unit in the loop or between the loop and the optical transceiver, to delay the lights propagated through the loop.

Even if being applied to the midpoint of the loop, the physical change or vibration surely causes a phase difference between the lights oppositely propagated through the loop, and therefore, is surely detectable according to the signal from the photo-detector.

A nineteenth aspect of the present invention provides an optical fiber communication apparatus having an optical transceiver connected to open ends of a loop made of a plurality of optical fibers including a target optical fiber, and a local unit attached to the loop. The optical transceiver has a light source for emitting a light, a first microphone for converting a voice into an electric signal, a driver for modulating the light from the light source according to the electric signal from the first microphone, a splitter-coupler for splitting the light from the light source, making the split lights incident to the open ends of the loop, respectively, so that the lights are oppositely propagated through the loop, receiving the oppositely propagated lights, and coupling the received lights so that they interfere with each other, a first photo-detector for converting the interfering lights into an electric signal, and a first voice unit for demodulating the electric signal from the first photo-detector into a voice signal. The local unit has a bender for bending the loop, a second photo-detector for receiving leakage lights from the bend of the loop and converting them into an electric signal, a second voice unit for demodulating the electric signal from the second photo-detector into a voice signal, a second microphone for converting a voice into an electric signal, and a vibrator for applying vibration to the loop according to the electric signal from the second microphone.

At a first work point at the open ends of the loop, the first microphone converts a voice into an electric signal, and the driver modulates a light from the light source according to the electric signal. The splitter-coupler splits the light from the light source and makes the split lights incident to the open ends of the loop. At a second work point where the local unit is installed, the bender bends the loop, the second photo-detector receives leakage lights from the bend and converts them into an electric signal, and the second voice unit demodulates the electric signal into a voice signal.

At the second work point, the second microphone converts a voice into an electric signal, and the vibrator vibrates the loop according to the electric signal. At this time at the first work point, the splitter-coupler couples the lights oppositely propagated through the loop to make the lights interfere with each other. The first photo-detector converts the interfering lights into an electric signal that indicates the intensity of the interfering lights and is responsive to a change in the phase difference between the lights. The first voice unit demodulates the electric signal into a voice signal, which is used to reproduce the voice entered by the local unit.

The nineteenth aspect enables the first and second work points to carry out a conversation between them through the loop once the target optical fiber that forms a part of the loop is identified.

A twentieth aspect of the present invention structures the apparatus of the nineteenth aspect such that the driver of the optical transceiver FM-modulates a light from the i light source, the first voice unit of the optical transceiver AM-demodulates a signal from the first photo-detector into a voice signal, and the second voice unit of the local unit FM-demodulates a signal from the second photo-detector into a voice signal.

The twentieth aspect differently modulates and demodulates a signal from the optical transceiver to the local unit and a signal from the local unit to the optical transceiver so that each of the optical transceiver and local unit can clearly reproduce a voice signal sent from the opposite party without crosstalk.

A twenty-first aspect of the present invention provides an optical fiber communication method including the steps of connecting each end of a plurality of optical fibers to each other through an optical connector to form a loop having two open ends, connecting an optical transceiver to the open ends of the loop, attaching a local unit to the loop between the optical transceiver and the optical connector, and carrying out optical-transceiver steps and local-unit steps. The optical-transceiver steps include emitting a light from a light source, converting a voice into an electric signal by a first microphone, modulating the light from the light source by a driver according to the electric signal from the first microphone, splitting the light from the light source by a splitter-coupler, making the split lights incident to the open ends of the loop, respectively, so that the split lights are oppositely propagated through the loop, coupling the oppositely propagated lights by the splitter-coupler so that they interfere with each other, converting the interfering lights into an electric signal by a first photo-detector, and demodulating the electric signal into a voice signal by a first voice unit. The local-unit steps include bending the loop, receiving leakage lights from the bend by a second photo-detector, converting the leakage lights by the second photo-detector into an electric signal, demodulating the electric signal into a voice signal by a second voice unit, converting a voice into an electric signal by a second microphone, and vibrating the loop by a vibrator according to the electric signal from the second microphone, thereby carrying out a conversation between the optical transceiver and the local unit.

A twenty-second aspect of the present invention adds, to the twenty-first aspect, the step of inserting a delay unit in the loop or between the loop and the optical transceiver, to delay the lights propagated through the loop.

Even if the second work point is at the midpoint of the optical-fiber loop, the twenty-second aspect surely causes a phase difference between the lights oppositely propagated through the loop and surely detects a signal applied to the loop by the local unit, according to the signal from the first photo-detector.

A twenty-third aspect of the present invention adds, to any one of the twenty-first and twenty-second aspects, the steps of FM-modulating a light from the light source by the driver of the optical transceiver, AM-demodulating a signal from the first photo-detector into a voice signal by the first voice unit of the optical transceiver, and FM-demodulating a signal from the second photo-detector into a voice signal by the second voice unit of the local unit.

This aspect employs different modulation techniques for a signal from the optical transceiver to the local unit and for a signal from the local unit to the optical transceiver, so that each of the optical transceiver and local unit may clearly reproduce voice from a signal sent from the opposite party without crosstalk.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 1 is a block diagram showing an apparatus for detecting a signal/vibration based on optical interference according to an embodiment of the present invention;

FIG. 3 is a block diagram showing a use of the apparatus of FIG. 1;

FIG. 6 is a block diagram showing an apparatus for detecting a signal/vibration based on optical interference according to another embodiment of the present invention;

DETAILED DESCRIPTION OF THE EMBODIMENTS

Figure 2A:
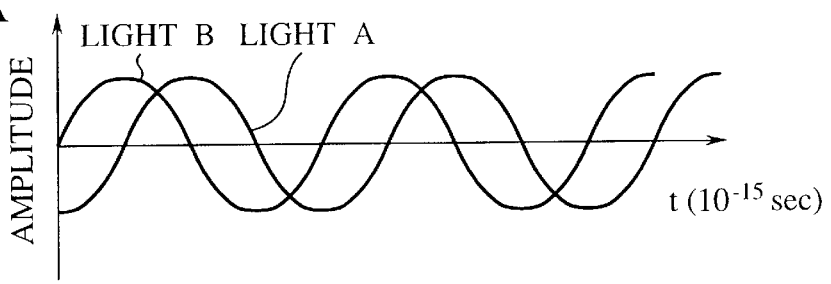
FIGS. 2A to 2D are waveform diagrams showing various signals in the apparatus of FIG. 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. For the sake of simplicity, each light source is DC-modulated if not specifically mentioned, and each splitter-coupler has equal splitting and coupling efficiencies.

FIG. 1 shows an apparatus for detecting a signal/vibration based on optical interference according to an embodiment of the present invention. A light source 1 is a laser diode which is excited by a driver 10 and emits a laser light. The light is split by a splitter-coupler 2, and the split lights are made incident to open ends of a loop 3 made of the plurality of optical fibers so that the split lights are oppositely propagated through the loop in the clockwise direction A and counterclockwise direction B. Hereinafter, the light propagated in the clockwise direction A is referred to as the light A or wave A, and the light propagated in the counterclockwise direction as the light B or wave B. After propagation through the loop, the lights A and B are coupled together so that they interfere with each other. The interfering lights are detected by a photo-detector (photo-detector) 5 made of a photodiode. The photo-detector 5 converts the interfering lights into an electric signal that indicates the intensity of the interfering lights. The electric signal is amplified by an amplifier 11, and the amplified signal is provided outside.

Figure 2B:
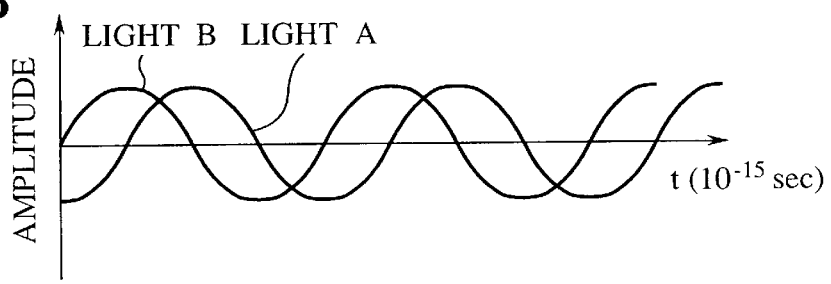
Figure 2C:
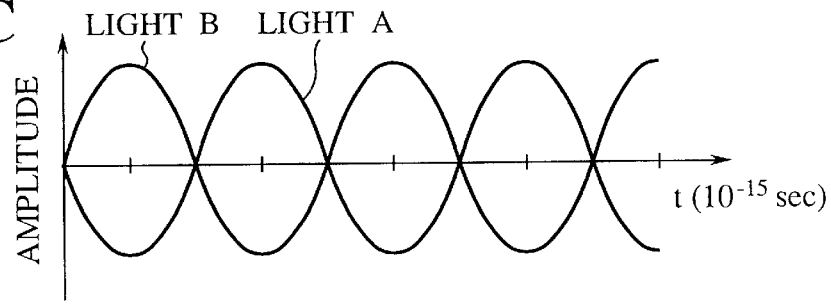

FIGS. 2A to 2D show phases of the lights A and B oppositely propagated through the loop 3. FIG. 2A shows the lights A and B just split by the splitter-coupler 2 with the splitter-coupler 2 being an optical fiber coupler. Since a cross port of the optical fiber coupler causes a phase shift of $\pi/2$ to the light passing there, there is a shift of $\pi/2$ between the phases of the lights A and B. FIG. 2B shows waveforms of the lights A and B oppositely propagated through the loop 3 and reached the splitter-coupler 2. Although the lights A and B are oppositely propagated, the lights pass through the same optical path, i.e., the loop 3 and therefore, they receive the same loss and phase change due to the reversibility of light. Accordingly, the lights A and B have substantially equal amplitudes and phases except the phase difference of FIG. 2A. After the opposite propagation, the lights A and B are coupled together by the splitter-coupler 2 so that they interfere with each other as shown in FIG. 2C. When the light B passes through the cross port of the splitter-coupler 2, its phase is again shifted by $\pi/2$, and therefore, the phases of the lights A and B are shifted by $\pi$ in total with respect to each other.

If the wavelength of the light emitted by the light source 1 is 1.3 μm, a period thereof is $4\times10^{-15}$ sec because the velocity of light in vacuum is about 300,000 km/sec. Accordingly, the abscissa of each of FIGS. 2A to 2C represents a time span of about $10^{-15}$ sec.

Figure 2D:
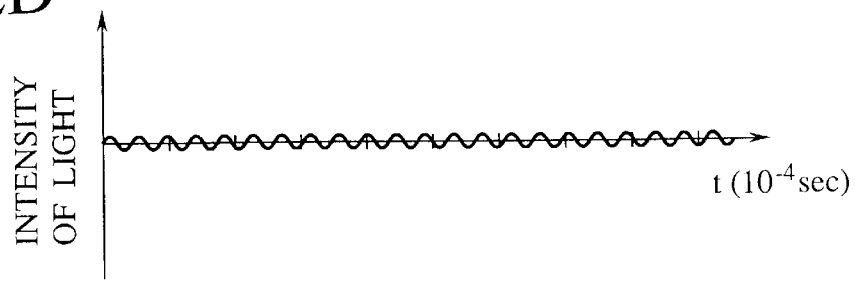

Generally, photo-detectors (photo-detectors) convert only the intensity of a light into an electric signal and do not convert the phase thereof. As a result, the photo-detectors provide a constant DC signal corresponding to a DC signal of a light source. When the splitter-coupler 2 is an optical fiber coupler, the lights A and B involve a phase difference of n after they are oppositely propagated through the loop 3. Therefore, under nearly ideal conditions, the output of the splitter-coupler 2 is as shown in FIG. 2D.

FIG. 3 is a block diagram showing the apparatus of FIG. 1 with vibration being applied to a part of the loop 3. The light source 1 is excited by the driver 10 and emits a light, which is split by the splitter-coupler 2 into lights A and B. The lights A and B are propagated clockwise and counterclockwise, respectively, through the loop 3 and are subjected to vibration at a vibration point P. The oppositely propagated lights A and B are coupled by the splitter-coupler 2 so that they interfere with each other. The interfering lights are converted by the photo-detector 5 into an electric signal that indicates the intensity of the interfering lights. The electric signal is amplified by the amplifier 11 and is provided outside.

Figure 4A:
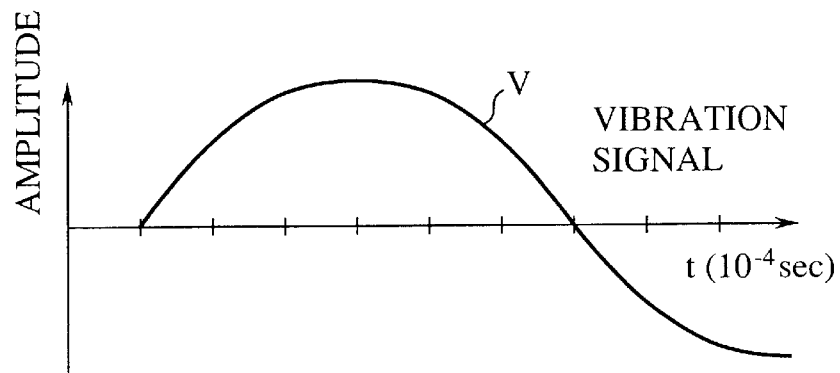
FIGS. 4A and 4B are waveform diagrams showing a vibration signal and phase shifts caused in propagated lights by the vibration signal according to the embodiment of FIG. 1
Figure 4B:
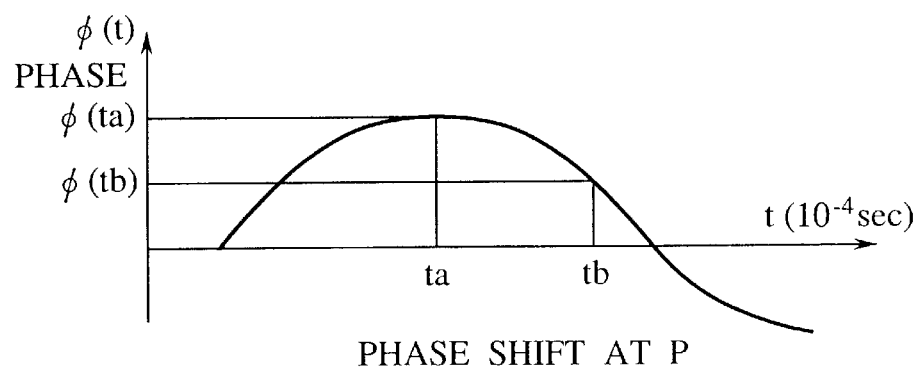

Changes on the lights A and B due to the vibration will be explained with reference to FIGS. 4A and 4B. FIG. 4A shows a waveform V of the vibration applied to the vibration point P of the loop 3. Due to the vibration, the loop 3 locally contracts and expands to change the length thereof, i.e., the length of the optical path of the lights A and B. As a result, the phases of the lights A and B are changed at the vibration point P depending on the amplitude of the vibration signal V as shown in FIG. 4B. Since the lights A and B are oppositely propagated through the loop 3 they oppositely receive an equal phase shift due to the change in the length of the optical. path. Thereafter, the lights are coupled by the splitter-coupler 2 into interfering lights, which are converted by the photo-detector 5 into an electric signal that indicates the intensity of the interfering lights. The electric signal is amplified by the amplifier 11 and is provided outside.

Figure 5A:
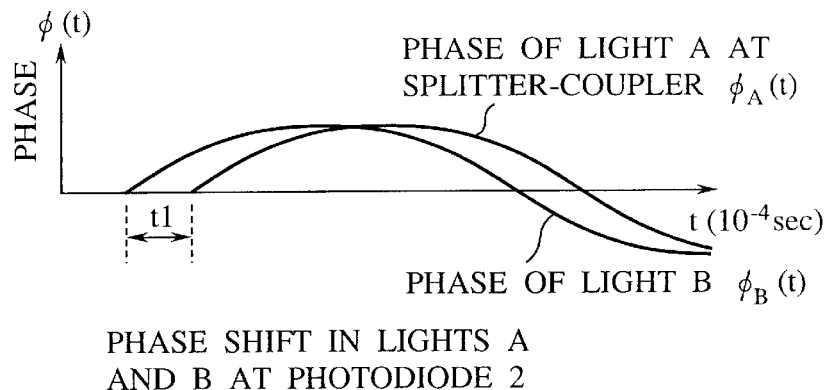
FIGS. 5A to 5C are waveform diagrams showing output signals of a photo-detector of the apparatus of FIG. 1 that change in response to applied vibration.
Figure 5B:
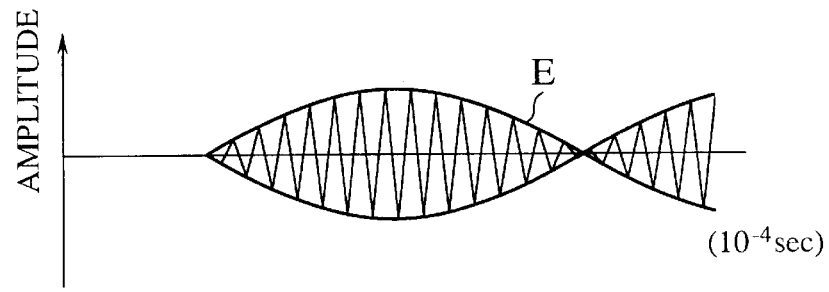
Figure 5C:
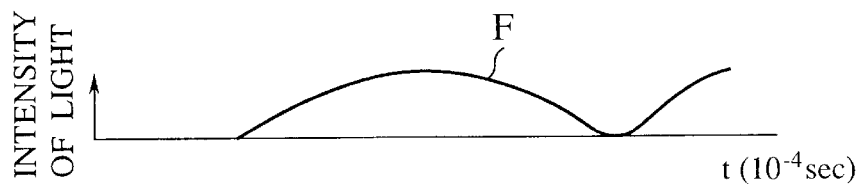

FIGS. 5A to 5C show the phases of the lights A and B oppositely propagated through the loop 3. The phases of the lights A and B arriving at the splitter-coupler 2 are shifted from each other as shown in FIG. 5A. The phase shift corresponds to a delay time t1 that corresponds to the difference between the distances for which the lights A and B travel from the vibration point P to the splitter-coupler 2. The splitter-coupler 2 couples the received lights A and B into interference waves whose envelope E changes according to the amplitude of the applied vibration, as shown in FIG. 5B. Light is a wave having a period of about $10^{-15}$ sec, and therefore, a change in the intensity of light is expressed with an amplitude envelope E in a time span of about $10^{-4}$ sec. The photo-detector 5 provides an electric signal F whose waveform is substantially equal to the vibration waveform applied to the loop 3 as shown in FIG. 5C. If there is no vibration, the photo-detector 5 provides an electric signal of nearly zero as shown in FIG. 2D.

If the difference between the distances for which the lights A and B must travel from the vibration point P to the splitter-coupler 2 is zero, i.e., if the vibration point P is at the midpoint of the loop 3 the lights A and B are vibrated at the same time and simultaneously arrive at the splitter-coupler 2. In this case, the phases of the lights A and B are equally influenced by the vibration, and the phase difference between them (FIG. 5A) becomes nearly zero. Then, no phase shift is observed in the interfering lights made of the lights A and B, and therefore, it is impossible to detect the vibration.

If the vibration signal is of 1 kHz to 1 MHz, a signal period thereof is $10^{-3}$ to $10^{-6}$ sec, and therefore, the abscissa of any one of FIGS. 5A to 5C represents a time span of about $10^{-3}$ to $10^{-6}$ sec. If the difference between the distances the lights A and B must travel from the vibration point P to the splitter-coupler 2 is 1 km, the delay time t1 is about $10^{-6}$ sec because a group velocity in the optical fiber is about 200,000 km/sec.

The apparatus for detecting a signal/vibration based on optical interference of the present invention will be explained with mathematical expressions. For the sake of simplicity of explanation, it is assumed that the light source 1 is a laser diode that emits a DC-modulated light and the splitter-coupler 2 is a 3-dB optical coupler whose splitting and coupling efficiencies are equal to each other. light from the light source 1 is split by the splitter-coupler 2 into lights A and B of substantially the same power. The lights A and B are oppositely propagated through the loop 3 and are coupled together by the splitter-coupler 2 into interfering lights. The interfering lights are detected by the photo-detector 5, which is a photodiode and provides an electric signal representing the intensity of the interfering lights.

Since the lights A and B are generated at the same time by the same light source 1 and are oppositely propagated through the same loop 3 they simultaneously arrive at the splitter-coupler 2 and are coupled together thereby. If no phase shift is applied to the lights A and B, the lights interfere with each other at the same phase in the splitter-coupler 2. When a vibrator 6 applies vibration to the vibration point P of the loop 3 the loop 3 locally expands and contracts, to change the phases of the lights A and B at the same period as that of the vibration.

In FIG. 4B, $\phi(t)$ is a phase shift applied by the vibrator 6 at the vibration point P to the electric field of a light propagated through the loop 3. The light A is emitted by the light source 1 at a certain time point and is propagated through the loop 3. The phase of an electric field of the light A is shifted by the vibrator 6 at the vibration point P at time ta. The light B is emitted by the light source 1 simultaneously with the light A and is oppositely propagated through the loop 3. The length of an optical path to the vibration point P for the light B is longer than that for the light A, and therefore, the light B arrives the vibration point P temporally behind the light A and the phase of the electric field of the light B is shifted by the vibrator 6 at time tb. As a result, a phase shift $\phi(ta)$ in the electric field of the light A differs from a phase shift $\phi(tb)$ in the electric field of the light B due to the difference between ta and tb. The difference between ta and tb is dependent on the position of the vibration point P in the loop 3 and corresponds to the difference between the phase shifts $\phi(ta)$ and $\phi(tb)$.

The phases of the electric fields of the lights A and B are shifted at the vibration point P, and the lights A and B are coupled together by the splitter-coupler 2. FIG. 5A shows the waveforms of the phases of the electric fields of the lights A and B arrived at the photo-detector 5.

At the vibration point P, the light A receives the phase shift $\phi(ta)$ and the light B the phase shift $\phi(tb)$. An angular frequency of light is no, and the amplitudes of the electric fields of the lights A and B entering the loop 3 from the splitter-coupler 2 are A and B, respectively. The lengths of clockwise and counterclockwise optical paths of the lights A and B along the loop 3 are equal to each other. The influence of polarization is ignored for the sake of simplicity of calculations.

The electric field of the light A phase-shifted by the vibrator 6 and arrived at a receiving face of the photo-detector 5 is expressed as follows:

$$Ea(t) A \cos(\chi_0 t + \phi(t_a)) \tag{1}$$

In the splitter-coupler 2, the phases of coupled lights at a cross port are $\pi/2$ behind those of emitted lights at a through port. Since the light B is passed through the cross port of the splitter-coupler 2 twice, the electric field of the light B is expressed as follows:

$$Eb(t) = B \cos(\chi_0 t + \phi(t_b) - \pi) \tag{2}$$

The photo-detector 5 receives the overlapping of the electric fields of the expressions (1) and (2), and an optical current of the received lights is proportional to the power of the lights. Therefore, an output current I of the photo-detector 5 is expressed as follows:

$$\begin{aligned}
I \propto P &= [Ea(t) + Eb(t)]^2 \\
&= [A\cos(\omega_0 t + \phi(t_a)) + B\cos(\omega_0 t + \phi(t_b) - \pi)]^2 \\
&= A^2 \cos^2(\omega_0 t + \phi(t_a)) + B^2 \cos^2(\omega_0 t + \phi(t_b) - \pi) + \\
&\quad 2AB\cos(\omega_0 t + \phi(t_a))\cos(\omega_0 t + \phi(t_b) - \pi) \\
&= \frac{A^2}{2}[1 + \cos 2(\omega_0 t + \phi(t_a))] + \frac{B^2}{2}[1 + \cos 2(\omega_0 t + \phi(t_b) - \pi)] + \\
&\quad 2AB[\cos\omega_0 t \cos\phi(t_a) - \sin\omega_0 t \sin\phi(t_a)] \times \\
&\quad [\cos\omega_0 t \cos(\phi(t_b) - \pi) - \sin\omega_0 t \sin(\phi(t_b) - \pi)]
\end{aligned} \tag{3}$$

This expression is developed and rearranged, and a term related to an optical angular velocity that the photo-detector 5 is unable to detect is ignored. Then, the output current I is expressed as follows:

$$I \propto \frac{A^2}{2} + \frac{B^2}{2} + AB\cos(\phi(t_a) - \phi(t_b) + \pi) \tag{4}$$

This expression shows that a signal reproduced from the optical current involves a change of $|\phi(ta) - \phi(tb) + \pi|$ that corresponds to a phase shift $\phi(t)$ at the vibration point P, i.e., a change in the amplitude of the vibration at the vibration point P.

If the vibration point P is at the midpoint of the loop 3, $\phi(ta) = \phi(tb)$ to make the difference zero. In this case, the expression (4) provides a constant to cause no change in the output of the photo-detector 5. If the level of the signal reproduced from $|\phi(ta) - \phi(tb) + \pi|$ is smaller than a noise level, it is impossible to detect the signal. To secure the level of the reproduced signal so that the signal is detectable, $|\phi(ta) - \phi(tb) + \pi|$ must sufficiently be large. For this purpose, an optical delay unit 7 is installed at the midpoint of the loop 3 as shown in FIG. 6. The delay unit 7 is made of a drum of an optical fiber whose length is dependent on the properties of the apparatus. The delay unit 7 secures a sufficient time difference of "ta−tb" so that the reproduced signal based on the output of the photo-detector 5 is surely detectable.

Figure 7:
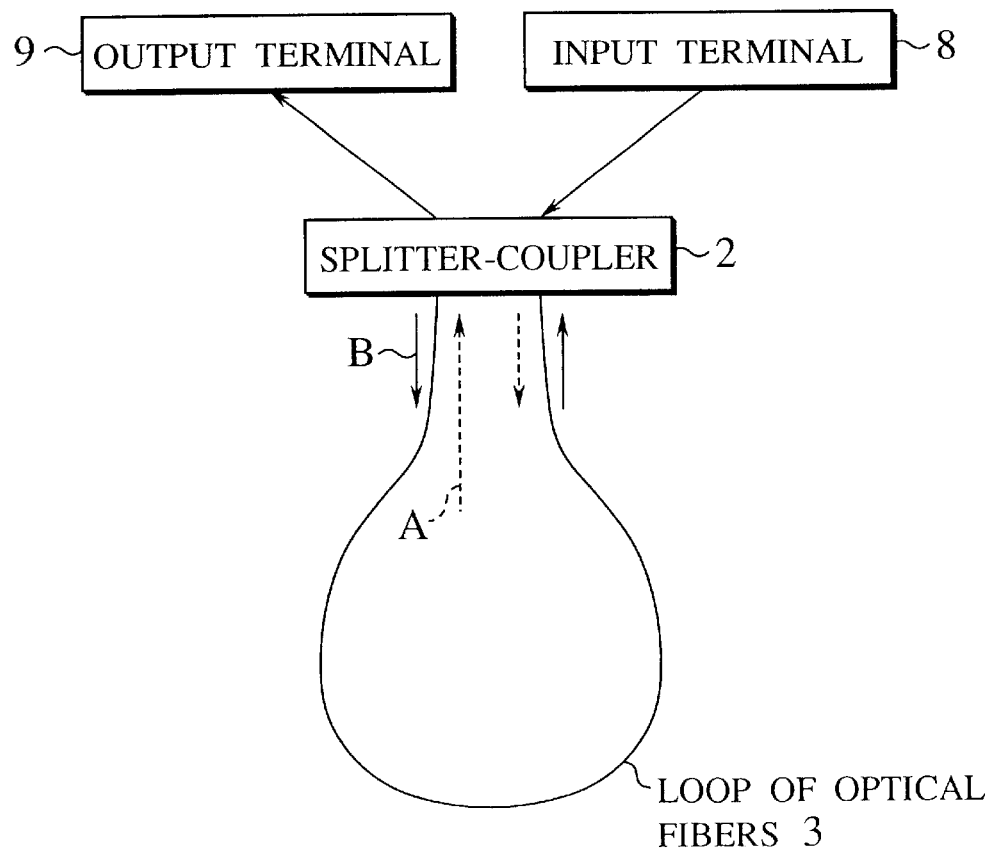
FIG. 7 is a block diagram showing an apparatus for detecting a signal/vibration based on optical interference according to still another embodiment of the present invention.

In the embodiments mentioned above, the light source 1 emits a light to the splitter-coupler 2, and the photo-detector 5 converts the output of the splitter-coupler 2 into an electric signal, which is used to detect a physical change or vibration applied to the loop 3. The light source 1, driver 10, photo-detector 5, amplifier 11, etc., may be arranged in a signal processing unit. In this case, the apparatus of the present invention is provided with an optical input terminal 8 for supplying an optical signal to the splitter-coupler 2 and an optical output terminal 9 for receiving an optical signal from the splitter-coupler 2, as shown in FIG. 7. The input and output terminals 8 and 9 are connected to the signal processing unit that contains the light source, driver, photo-detector, amplifier, etc.

A concrete example of the apparatus for detecting a signal/vibration based on optical interference according to the present invention will be explained. A single-mode optical fiber (SMF) of 10 km in length and 1.3 $\mu$m in wavelength is looped, and ends of the loop are connected to an optical coupler. The optical coupler is connected to a 1.3-$\mu$m semiconductor laser and a PID photo-detector, thereby forming the apparatus for detecting a signal/vibration based on optical interference.

The semiconductor laser is connected to a continuous-wave oscillator to continuously oscillate the laser in response to a DC signal. The PID photo-detector is connected to an amplifier whose output is observed with an oscilloscope.

A 10-kHz vibrator is connected to a small speaker, which is connected to a part of the loop. When the vibrator generates a 10-kHz vibration signal, one can observe a corresponding 10-kHz signal on the output of the amplifier without distortion.

To determine an optimum structure for the apparatus for detecting a signal/vibration based on optical interference, many tests were carried out. Results of the tests will be explained.
Test 1

Figure 8:
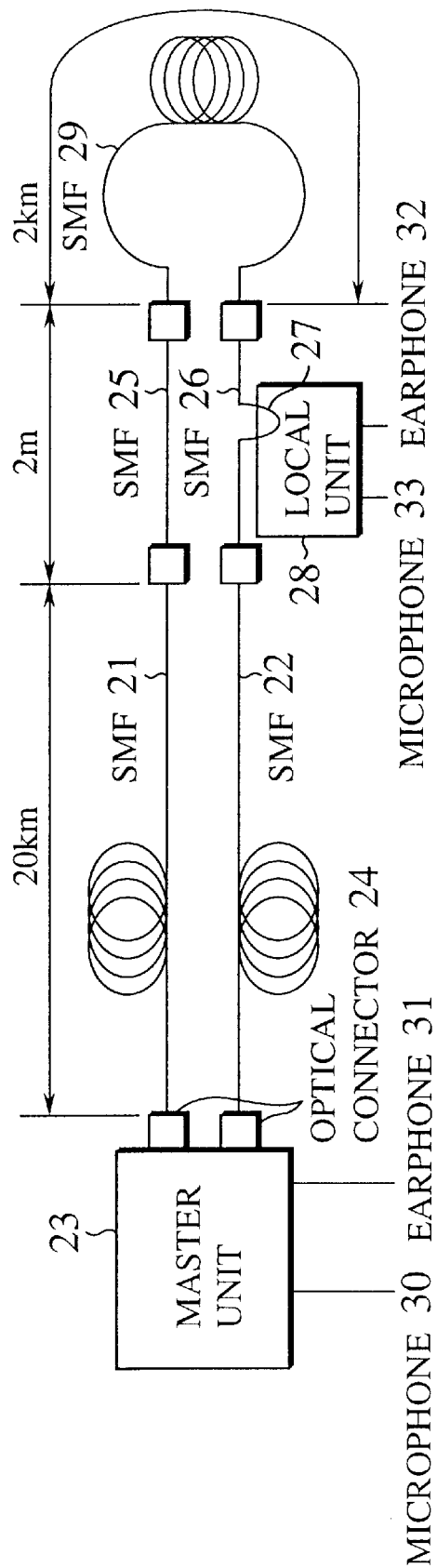
FIG. 8 is a block diagram showing a test model of an apparatus for detecting a signal/vibration based on optical interference according to the present invention.

FIG. 8 shows a basic test system. Two optical fibers 21 and 22 are each 20 km long. Ends of the optical fibers 21 and 22 are connected to a master unit 23 through optical connectors 24. The other ends of the optical fibers 21 and 22 are connected to supplemental optical fibers 25 and 26 each of 2 m long. A part of the optical fiber 26 is formed a bend 27, and a local unit 28 is attached thereto. The other ends of the optical fibers 25 and 26 are connected to an optical delay unit 29 of 2 km long.

The optical fibers are each a single mode fiber (SMF), and the optical connectors are each an FC connector.

The master unit 23 incorporates a DFB (distributed feedback) laser diode of 1.55 $\mu$m in wavelength serving as the light source 1 of FIGS. 3 and 6, a pulse unit (serving as the driver 10) for carrying out a 20-kHz pulse modulation, a photodiode serving as the photo-detector 5, a splitter/coupler (2), and an amplifier (11) for amplifying an electric signal provided by the photo-detector 5. The master unit 23 also has a microphone terminal 30 for superposing, on a light emitted from the light source 1, a voice signal provided by a microphone, and an earphone terminal 31 for an earphone for converting a signal from the amplifier 11 into a voice signal.

The local unit 28 has a photo-detector (not shown) for receiving leakage lights from the bend 27, an earphone terminal 32 for an earphone for converting an electric signal from the photo-detector into a voice signal, and a microphone terminal 33 for applying vibration to the bend 27 according to a voice signal provided by a microphone.

To carry out a test with the arrangement of FIG. 8, a signal is applied to the microphone terminal 33 of the local unit 28, and the output of the earphone terminal 31 of the master unit 23 is measured by a spectrum analyzer. The input signal applied to the local unit 28 is a sine wave of 1 kHz and 40 mV RMS.

A comparison test is made with a 1.55-$\mu$m DFB laser diode serving as the light source 1 and a continuous-wave oscillator serving as the driver 10 to make the laser diode continuously emit a light. Other conditions are the same as those of the main test.

Test results show that the main test with the laser source 1 emitting a 20-kHz pulse light is superior, in S/N ratio by about 30 dB, to the comparison test with the laser source 1 emitting a continuous light.
Test 2

The test 1 shows that the 20-kHz pulse light is effective as a source light. Accordingly, test 2 employs the 20-kHz pulse light and changes the type of the source light and measures the spectrum waveform of a reproduced signal. The other arrangements of the test 2 are the same as those of the test 1. The input signal to the local unit 28 is a 1-kHz, 40-mV RMS sine wave.

The 1.55-$\mu$m DFB laser diode found to be effective in the test 1, a 1.55-$\mu$m Fabry-Perot laser diode, a 1.55-$\mu$m SLD, and a 1.55-$\mu$m band ASE (a broad optical output from an optical amplifier) are used one after another as the light source 1.

Results of the tests show that the DFB laser diode of high coherency is optimum. The test results also show that the other light sources are applicable depending on using conditions.
Test 3

This test examines a proper length for the optical delay unit 29 of FIG. 8. The light source 1 is a DFB laser diode that provides a 20-kHz pulse light. The length of the delay unit 29 is changed among 1, 2, 3, and 4 km. The input signal to the local unit 28 is a 1-kHz, 40-mV RMS sine wave.
Test results show that 2 km and uppers are effective for the delay unit 29.

According to the tests 1 to 3, an optimum system for making the master unit 23 correctly reproduce a voice signal applied by the local unit 28 to the optical-fiber loop may employ:

a DFB laser diode as a light source;

a pulse light emitted from the DFB laser diode; and an optical delay unit of about 2 km long.
Test 4

Figure 9:
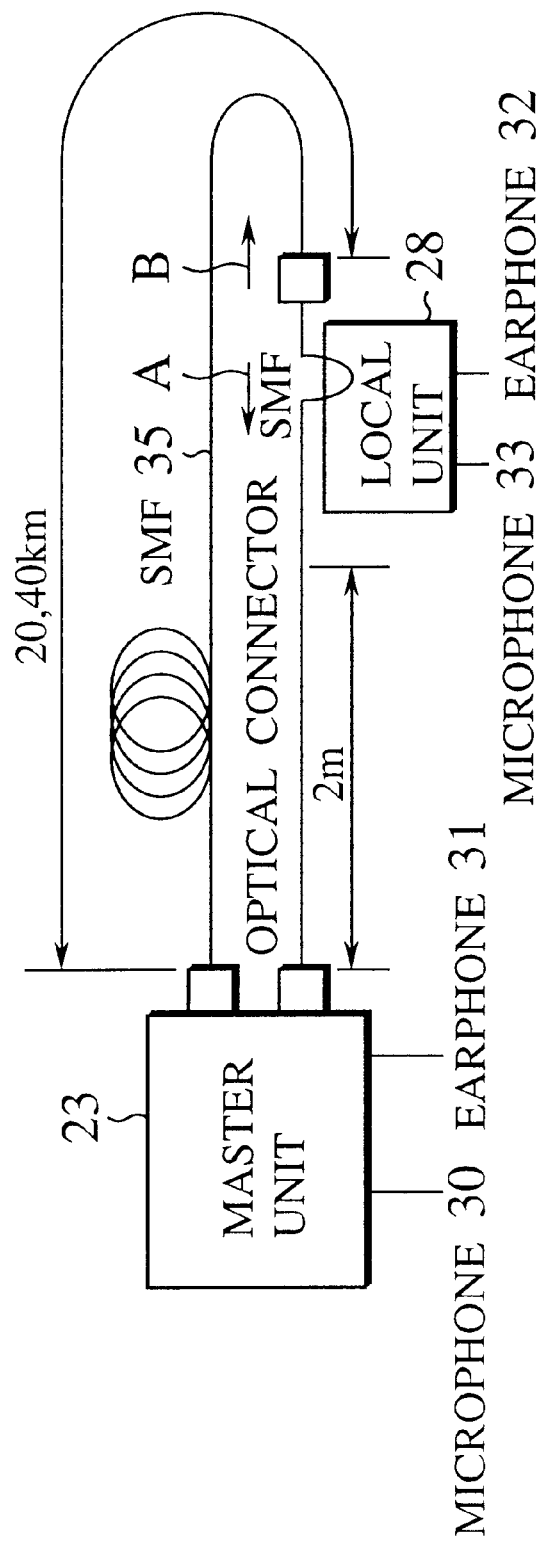
FIG. 9 is a block diagram showing another test model of an apparatus for detecting a signal/vibration based on optical interference according to the present invention.

FIG. 9 shows a test system employing no optical delay unit 29. The difference between optical paths in directions A and B from a local unit 28 to a master unit 23 in an optical-fiber loop 35 is changed between 20 km and 40 km to examine a change in the characteristics of the master unit 23 of reproducing a voice signal applied by the local unit 28. In FIG. 9, the same parts as those of FIG. 8 are represented with the same reference marks.

A result of the test shows that the longer the optical path difference, the larger the amplitude of a reproduced signal. It is preferable, therefore, that the local unit 28 must be positioned so as to maximize the optical path difference.

Each apparatus of the present invention mentioned above is capable of faithfully reproducing vibration applied to an optical-fiber loop. Therefore, the apparatus is applicable to carry out a conversation between the optical transceiver (master unit) 23 and the local unit 28 by converting a voice signal into an electric signal at the local unit, vibrating the loop according to the electric signal, and reproducing the voice signal from the vibration at the master unit and by converting a voice signal into an electric signal at the master unit, modulating an optical signal according to the electric signal at the master unit, and reproducing the voice signal from the modulated optical signal at the local unit.

The splitter-coupler of any one of the embodiments of the present invention may be made of an optical fiber coupler, an optical wave guide coupler, a half-mirror system, etc. The optical-fiber loop of any one of the embodiments may be made of single-mode optical fibers or multi-mode optical fibers. If the latter are employed, each optical fiber must be short and vibration applied thereto must be of low frequency. The light source of any one of the embodiments may be a laser or any other such as an LED. If the LED is employed, each optical fiber must be short and vibration applied thereto must be of low frequency. Instead of vibration, any other physical change such as a shock may be applied to the optical-fiber loop so that the apparatus of the present invention may detect the physical change according to a corresponding phase shift in propagated lights. The optical-fiber loop as a whole may serve as a part for sensing a physical quantity. To improve sensitivity, optical fibers may be arranged in multiple loops. The loop or loops may have a converting element such as an electro-optic sensor for sensing an electric field and a magnetic field and a physical-optic sensor for sensing pressure, to efficiently convert a physical quantity into a phase shift of propagated lights.

An apparatus for identifying a target optical fiber cable among many according to the present invention will be explained. This apparatus utilizes the principle of the technique for detecting signal/vibration based on the optical interference of the light propagating through the optical fiber loop set forth above. At a work site in, for example, a manhole, one must identify a target optical fiber cable among many cables laid at the site. The target cable may be a cable to be replaced or removed. At the start of the work, the target cable to be removed or replaced is disconnected from light transmitting and receiving devices equipped in a telephone station or relay station, and the work is successively carried out from a site to another. Accordingly, both ends of the target cable are known. However, at each intermediate site, it is difficult to identify the target cable because many cables are laid at each site. To easily identify the target cable, the present invention provides an apparatus of FIG. 10.

Figure 10:
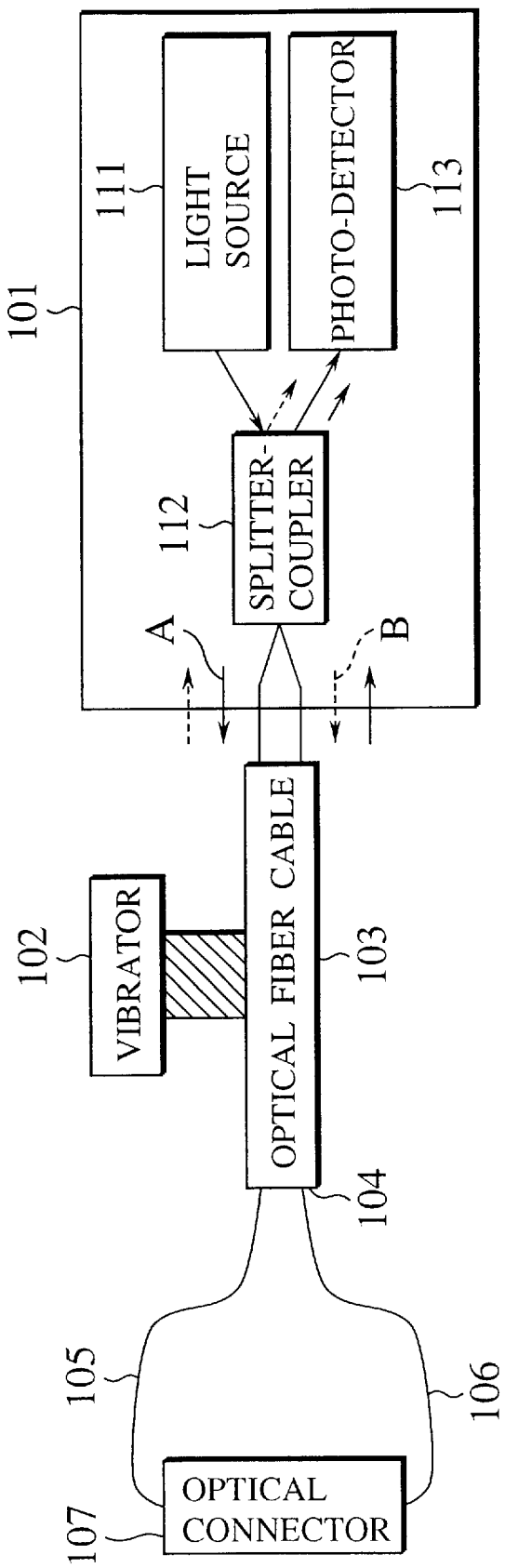
FIG. 10 is a block diagram showing an apparatus for identifying a target optical fiber cable according to still another embodiment of the present invention.

The apparatus of FIG. 10 employs an optical transceiver 101 installed at an end of a target optical fiber cable 103. The optical transceiver 101 is connected to arbitrary two optical fibers 105 and 106 contained in the target cable 103. At a work site, a vibrator 102 successively vibrates cables laid at the site one after another. At the other end 104 of the target cable 103, the optical fibers 105 and 106 are connected to each other through an optical connector 107 to form a loop.

The optical transceiver 101 makes lights incident to the optical fibers 105 and 106 so that the lights are oppositely propagated through the loop of the optical fibers 105 and 106, receives the propagated lights, detects a vibration signal in the received lights, and determines whether or not the cable vibrated by the vibrator 102 is the target cable 103. The optical transceiver 101 mainly consists of a light source 111 for emitting a laser light, a splitter-coupler 112, and a photo-detector (photo-detector) 113.

To identify the target cable 103, the optical transceiver 101 is connected to one ends of the optical fibers 105 and 106 contained in the target cable 103. The other ends of the optical fibers 105 and 106 are connected to each other through the connector 107 to form a loop. At a work site, the vibrator 102 vibrates cables laid at the site one after another. If the cable being vibrated is the target cable 103, the optical transceiver 101 detects it. This will be explained in more detail.

The light source 111 emits lights A and B into the optical fibers 105 and 106 so that the lights A and B are oppositely propagated through the loop of the optical fibers 105 and 106.

The propagated lights A and B interfere with each other at the splitter-coupler 112, the interference being constant as long as no vibration is applied by the vibrator 102 to the loop. If the vibrator 102 vibrates the loop, a change occurs in the interference. The change is detectable by observing a signal from the photo-detector 113. The photo-detector 113 receives the interfering lights and converts them into an electric signal. The waveform of the electric signal can be observed on an oscilloscope. The electric signal can lightplified and converted into sound, which can be heard on a speaker. Also, the electric signal can be analyzed by a spectrum analyzer.

The vibrator 102 vibrates cables one after another, and the optical transceiver 101 recognizes when the target cable 103 is vibrated according to a change in the interfering lights.

Figure 11:
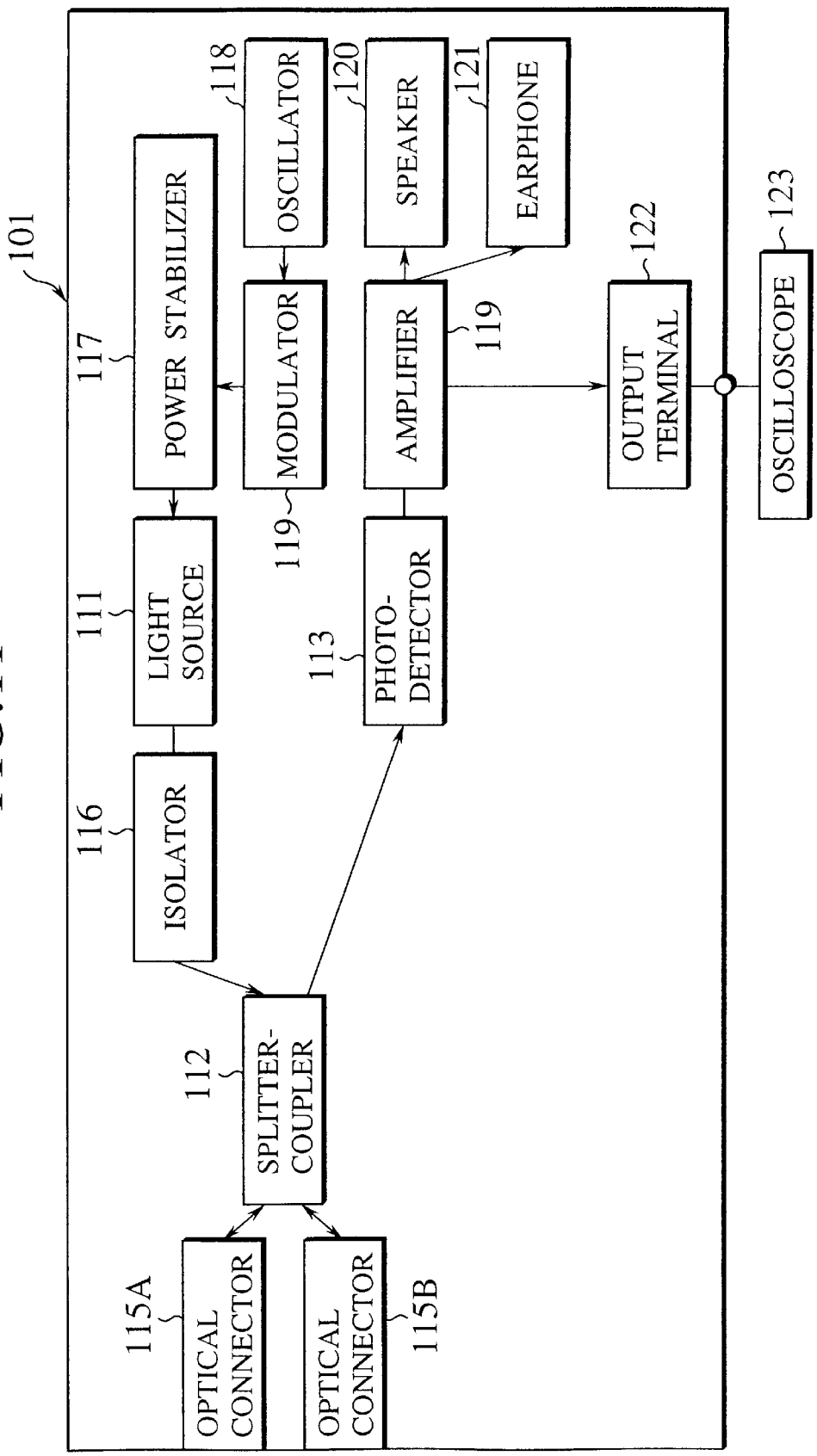
FIG. 11 is a block diagram showing an optical transceiver applicable to the apparatus of FIG. 10.

FIG. 11 shows the details of the optical transceiver 101. Optical connectors 115A and 115B are connected to two optical fibers contained in a target cable. An isolator 116 is a directional optical coupler. The light source 111 is a light emitting diode or a laser diode. The isolator 116 transfers a light from the light source 111 to the splitter-coupler 112 and blocks any light from the splitter-coupler 112 to the light source 111. A power stabilizer 117 makes the light source 111 emit a pulse light and stabilizes the power of the pulse light. A modulator 119 FM-modulates the pulse light according to an oscillation frequency of an oscillator 118. If required, the light source 111 may be DC-oscillated. In this case, the modulator 119 is omitted.

The splitter-coupler 112 receives a light from the isolator 116, splits the light, and transfers the split lights to the optical connectors 115A and 115B. Also, the splitter-coupler 112 receives lights from the optical connectors 115A and 115B, couples the lights so that they interfere with each other, and transfers the interfering lights to the photo-detector 113. The photo-detector 113 converts the interfering lights into an electric signal, which is amplified by an amplifier 119.

The output of the amplifier 119 is converted into a voice signal by a speaker 120 and an earphone 121 so that one may hear sound. The output of the amplifier 119 is also supplied to an output terminal 122, which is connected to an oscilloscope 123. The oscilloscope 123 displays an waveform of the output of the output terminal 122.

If the vibrator 102 (FIG. 10) is close to the midpoint of the loop of the optical fibers 105 and 106, optical paths for lights oppositely travelling from the vibration point toward the optical transceiver 101 will be equal to each other. This minimizes a change in the interference between the lights A and B.

Figure 12:
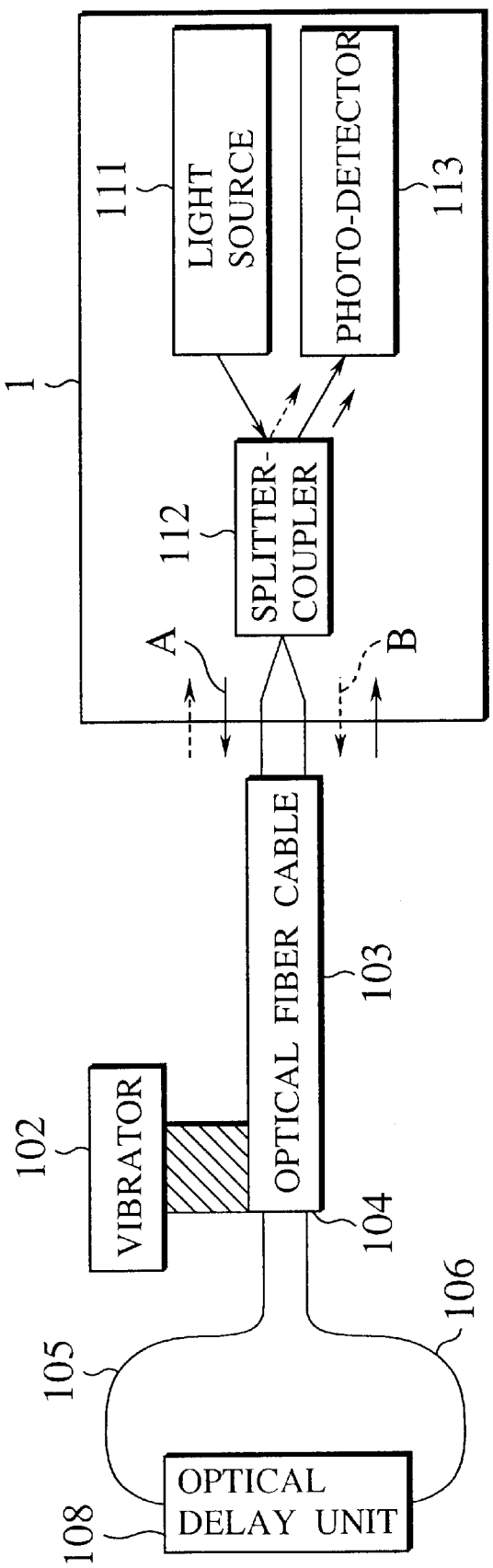
FIG. 12 is a block diagram showing an apparatus for identifying a target optical fiber cable according to still another embodiment of the present invention.

To solve this problem, an arrangement of FIG. 12 of the present invention inserts an optical delay unit 108 in place of the optical connector 107 (FIG. 10) between the optical fibers 105 and 106, to produce a large difference between the optical paths for lights oppositely travelling from the vibration point toward the optical transceiver 101. This improves the correctness of the optical transceiver 101 in identifying a target cable.

Figure 13:
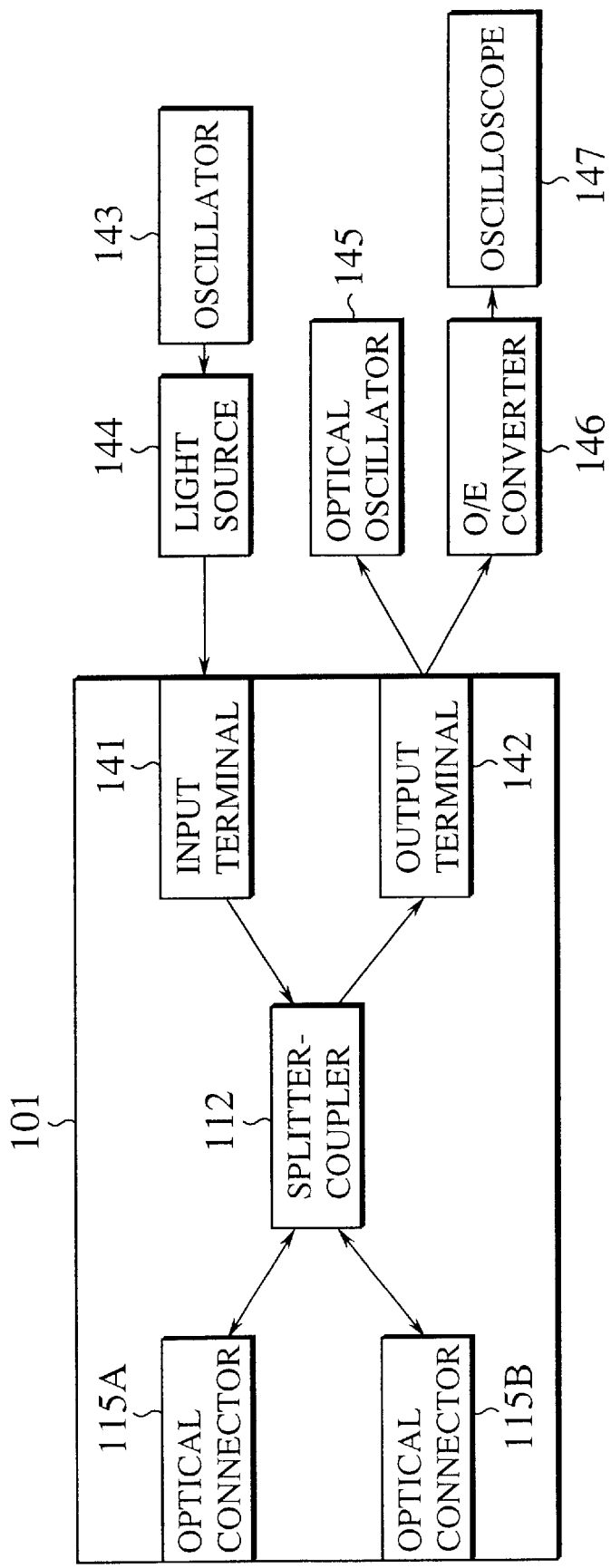
FIG. 13 is a block diagram showing an optical transceiver applicable to the apparatuses of FIGS. 10 and 12.

FIG. 13 shows a simple optical transceiver 101 applicable to the apparatuses of FIGS. 10 and 12. The optical transceiver 101 has a splitter-coupler 112 that operates like that of FIG. 11, optical connectors 115A and 115B connected to ends of optical fibers, an optical input terminal 141, and an optical output terminal 142.

To identify a target cable, the input terminal 141 is connected to an external light source 144. The light source 144 may be a laser diode or an LED, which is driven by an oscillator 143. The light source 144 emits a light into the input terminal 141.

The output terminal 142 is connected to an optical oscilloscope 145 to directly display a waveform of interfering lights. The output terminal 142 may be connected to an O/E converter 146 for converting an optical signal from the output terminal 142 into an electric signal whose waveform is displayed on an oscilloscope 147.

The optical transceiver 101 is capable of identifying a target cable like those of FIGS. 10 to 12.

In any one of the above embodiments, arbitrary two optical fibers to form a loop may be both in a target cable, or one in the target cable and the other in another cable in the same route, or one in the target cable and the other in another cable in a different route.

Figure 14:
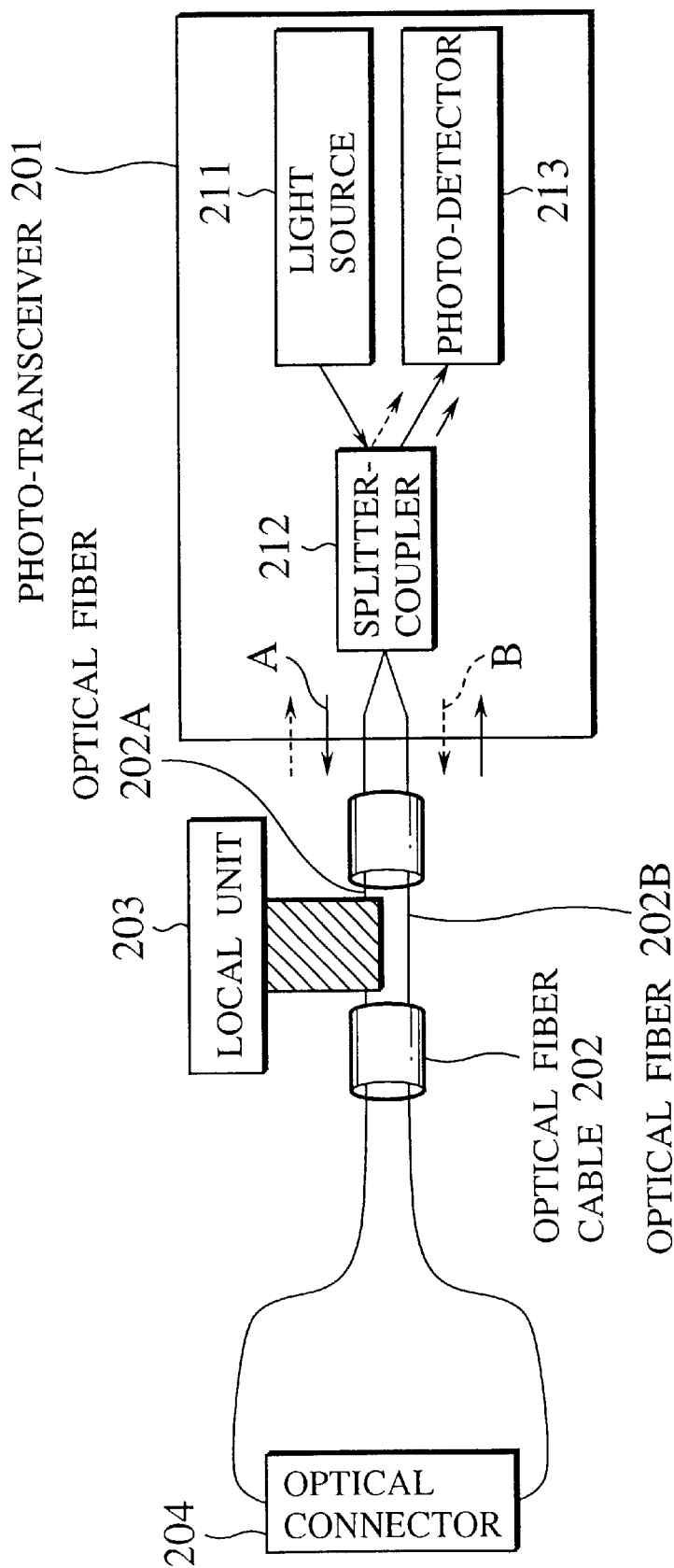
FIG. 14 is a block diagram showing an apparatus for identifying a target optical fiber according to still another embodiment of the present invention.

FIG. 14 shows an apparatus for identifying a target optical fiber according to still another embodiment of the present invention. This apparatus also utilizes the principle of the technique for detecting signal/vibration based on the optical interference of the light propagating through the optical fiber loop.

The apparatus identifies a target optical fiber among optical fibers contained in a given cable. If required, the identified optical fiber is used to carry out a conversation.

The apparatus consists of an optical transceiver 201, which has a light source 211 for emitting a laser light, a splitter-coupler 212, and a photo-detector (photo-detector) 213.

If it is required only to identify a target optical fiber, a local unit 203 may be the vibrator 102 of FIG. 10.

The optical transceiver 201 is connected to ends of optical fibers 202A and 202B contained in an optical fiber cable 202. One of the optical fibers 202A and 202B is a target optical fiber. The other ends of the optical fibers 202A and 202B are connected to each other through an optical connector 204 to form a loop.

Lights A and B are oppositely propagated through the loop. If the local unit 203 applies no vibration to the loop, the lights A and B cause a constant interference. If the local unit 203 applies vibration to the loop, a change is caused in the interference between the lights A and B, and the change appears in a signal provided by the optical transceiver 201.

The local unit 203 is operated at a work site to vibrate optical fibers contained in the cable 202 one after another. At a site where the optical transceiver 201 is installed, a signal from a speaker attached to the optical transceiver 201 or a waveform on an oscilloscope connected to the optical transceiver 201 is observed to identify the target optical fiber.

If the local unit 203 is at the midpoint of the loop, i.e., if optical paths for lights oppositely travelling from the local unit 203 toward the optical transceiver 201 are equal to each other, the difference between the optical paths is nearly zero to cause no phase difference between the lights even if vibration is applied to the loop by the local unit 203. In this case, no phase change is observed in the interference of the propagated lights, and therefore, it is impossible to detect the vibration. To solve this problem, the present invention provides an arrangement of FIG. 15. This embodiment employs an optical delay unit 205 in place of the optical connector 204 (FIG. 14) between the optical fibers 202A and 202B. The delay unit 205 is made of an optical fiber coil of, for example, 2 km long that is dependent on requirements.

Figure 15:
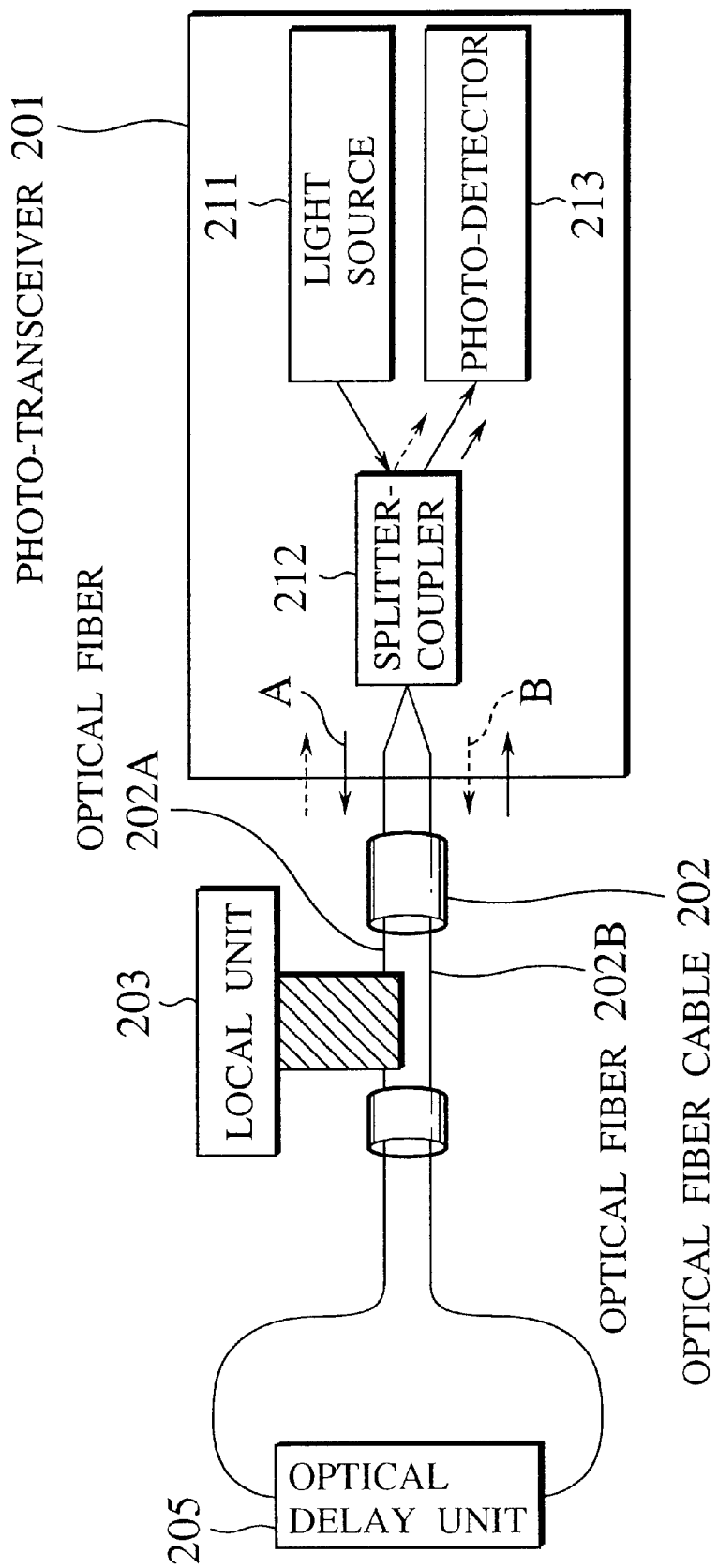
FIG. 15 is a block diagram showing an apparatus for identifying a target optical fiber according to still another embodiment of the present invention.
Figure 16:
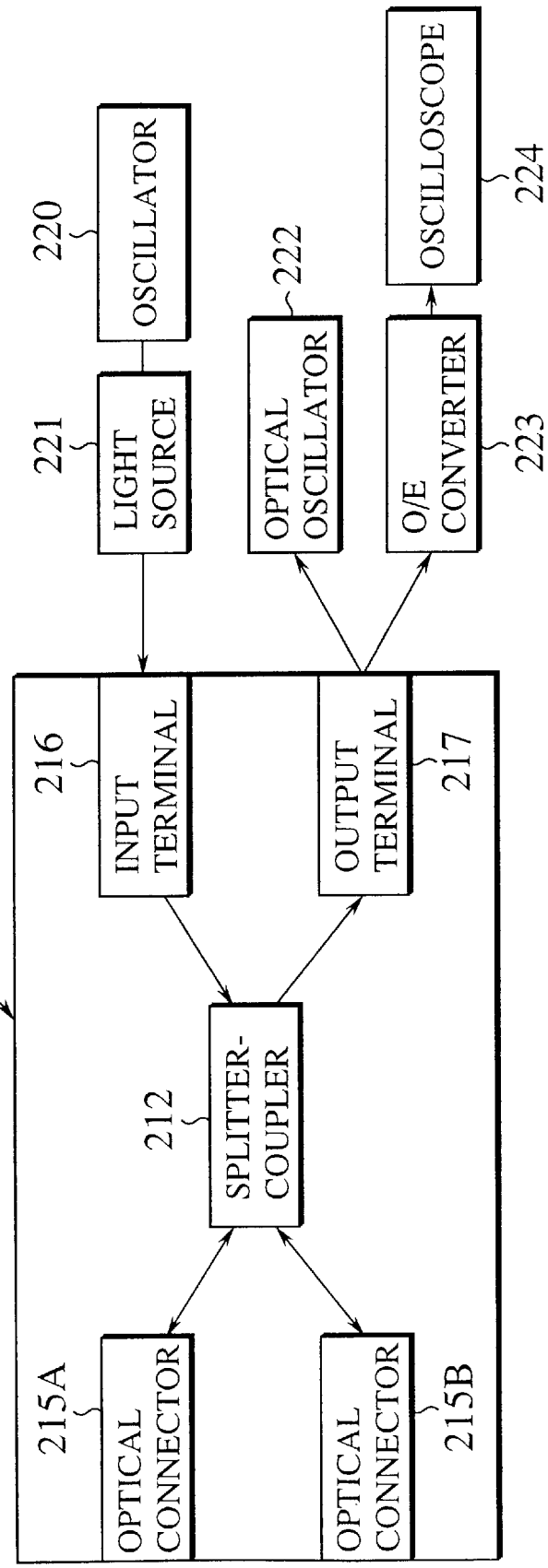
FIG. 16 is a block diagram showing an optical transceiver applicable to the apparatuses of FIGS. 14 and 15.

FIG. 16 shows a simple optical transceiver 201 applicable to the apparatuses of FIGS. 14 and 15. Optical connectors 215A and 215B are connected to optical fibers one of which is a target optical fiber. An optical input terminal 216 is connected to a light source 221 such as a laser diode. An oscillator 220 modulates a light emitted by the light source 221, and the modulated light is transferred to the input terminal 216. A splitter-coupler 212 provides interfering lights to an optical output terminal 217.

The splitter-coupler 212 splits a light from the input terminal 216 and supplies the split lights to the optical connectors 215A and 215B, respectively. The splitter-coupler 212 couples lights from the optical connectors 215A and 215B so that they interfere with each other and supplies the interfering lights to the output terminal 217. The optical connectors 215A and 215B, input terminal 216, output terminal 217, and splitter-coupler 212 are formed in one body.

The output terminal 217 is connected to an optical oscilloscope 222 that directly displays the waveform of interfering lights provided by the output terminal 217. The output terminal 217 may be connected to an O/E converter 223 that converts the interfering lights from the output terminal 217 into an electric signal whose waveform is displayed on an oscilloscope 224.

Combinations of the apparatus for identifying a target optical fiber and an optical fiber communication apparatus according to the present invention will be explained. Each combination is based on one of the embodiments of FIGS. 14 and 15. This apparatus also utilizes the principle of the technique for detecting signal/vibration based on the optical interference of the light propagating through the optical fiber loop.

Figure 17:
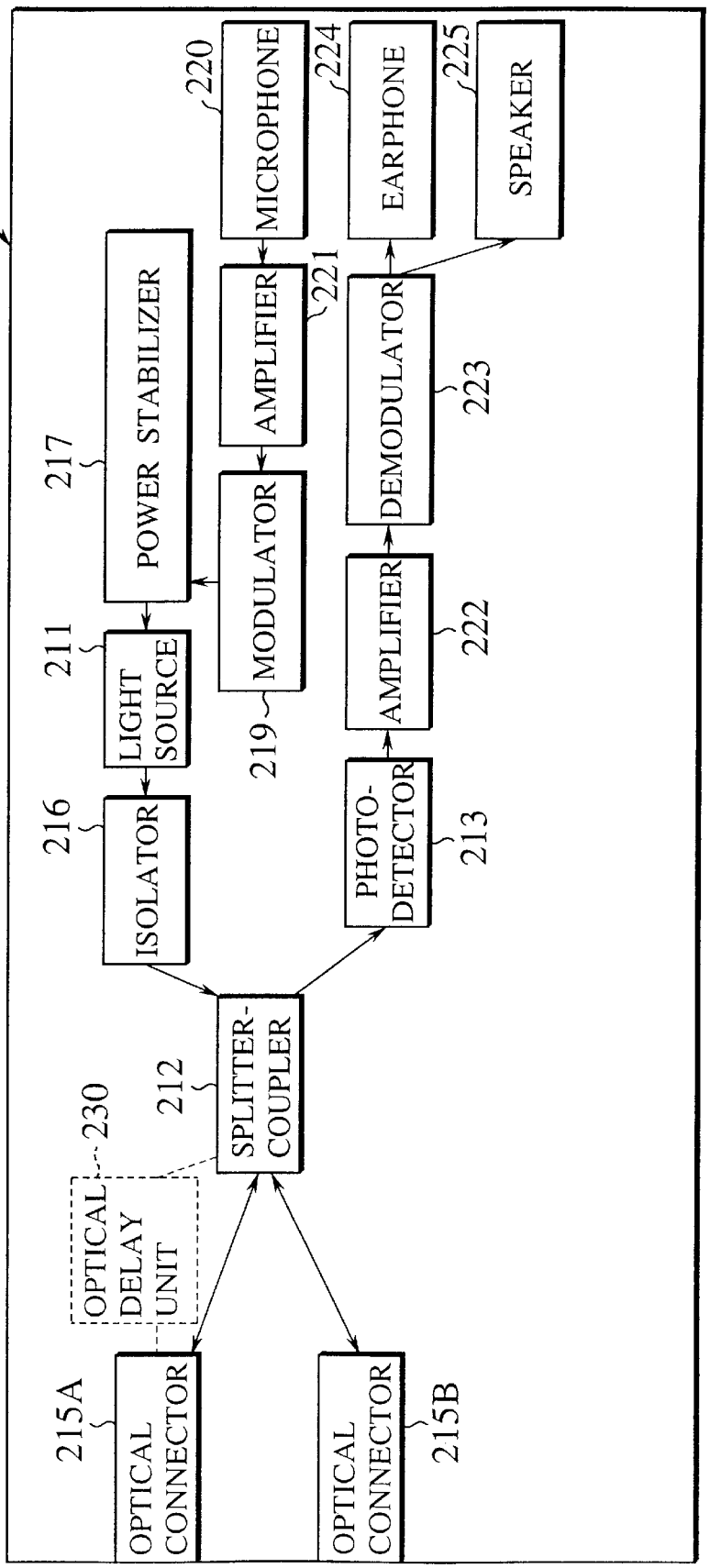
FIG. 17 is a block diagram showing an optical transceiver having a communication function applicable to the apparatuses of FIGS. 14 and 15.
Figure 18:
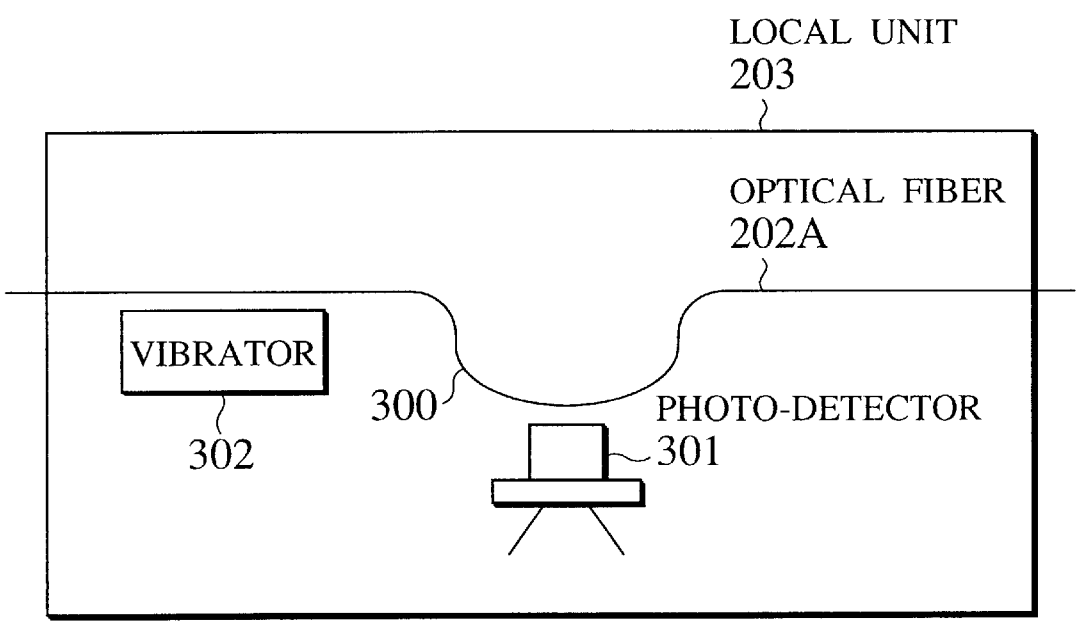
FIG. 18 is a block diagram showing a local unit having a communication function applicable to the apparatuses of FIGS. 14 and 15.

FIG. 17 shows an optical transceiver 201 and FIG. 18 shows a local unit 203, for identifying a target optical fiber and carrying out a conversation through the target optical fiber. The local unit 203 forms a bend 300 at a part of an arbitrary optical fiber among many contained in a cable 202. The local unit 203 has a photo-detector 301 for receiving leakage lights from the bend 300, and a vibrator 302 for vibrating the optical fiber.

The details of the optical transceiver 201 will be explained. Optical connectors 215A and 215B are connected to two optical fibers 202A and 202B one of which is a target optical fiber. The other ends of the optical fibers 202A and 202B are connected to each other to form a loop. An isolator 216 transfers a light from a light source 211 to a splitter-coupler 212 and blocks any light from the splitter-coupler 212 to the light source 211. The light source 211 is a laser diode and is driven by a power stabilizer 217, to emit a pulse light of constant power at predetermined intervals. The power stabilizer 217 may be a pulse FM circuit of simple structure.

A modulator 219 FM-modulates a pulse signal provided by the power stabilizer 217 according to a voice signal that is provided through a microphone 220 and an amplifier 221.

A photo-detector (photo-detector) 213 is a photodiode. The splitter-coupler 212 couples lights oppositely propagated through the optical-fiber loop so that the lights interfere with each other. The photo-detector 213 converts the interfering lights into an electric signal. An amplifier 222 amplifies the electric signal. A demodulator 223 AM-demodulates the amplified signal and provides a voice-band signal, which is processed by an earphone 224 into a voice. Instead of the earphone 224, a speaker 225 may reproduce the voice.

Figure 19:
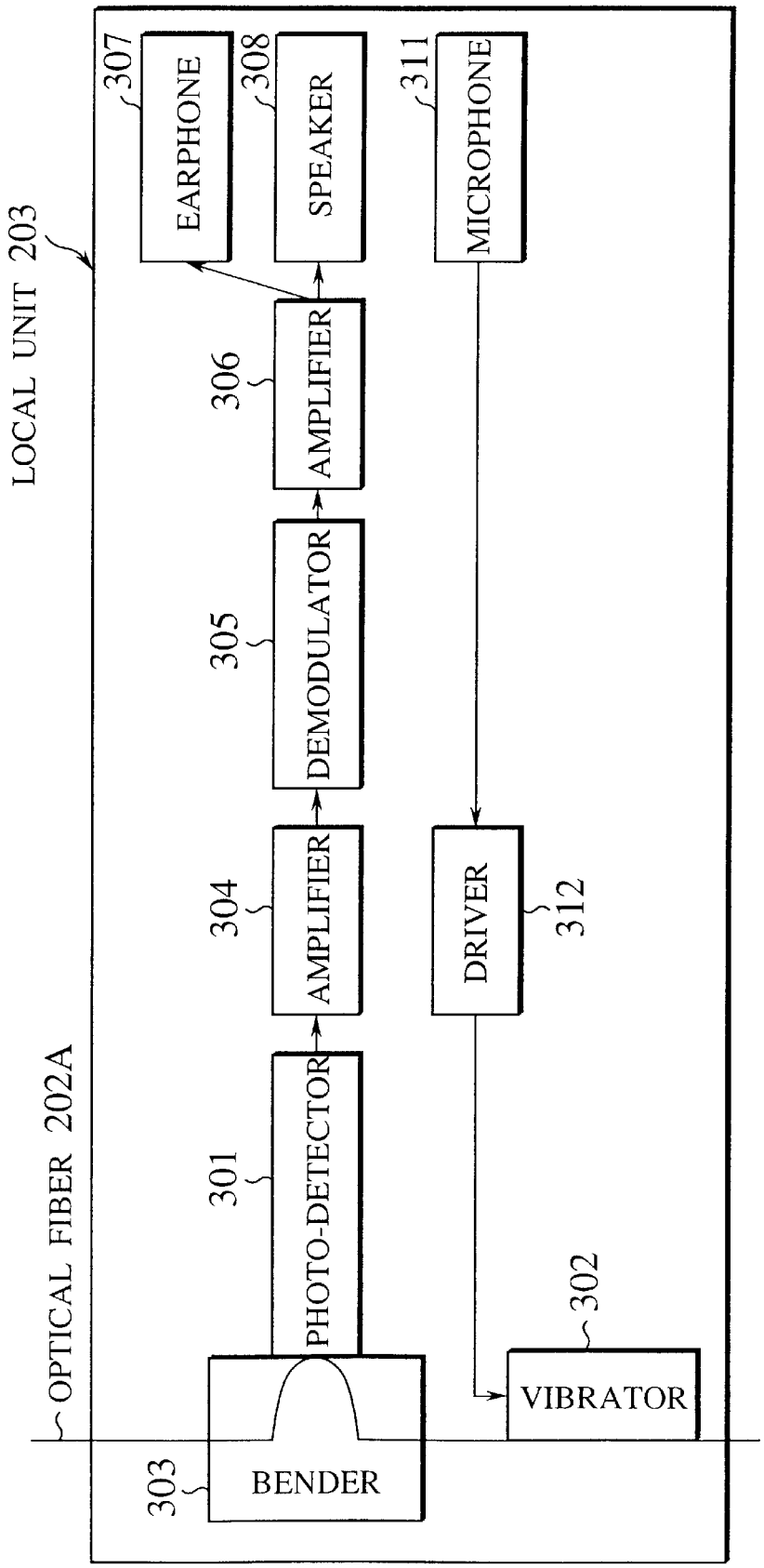
FIG. 19 is a block diagram showing a local unit having a communication function applicable to the apparatuses of FIGS. 14 and 15.

FIG. 19 shows a concrete example of the local unit 203 of FIG. 18. On the receiver side of the local unit 203, a bender 303 forms a bend 300 on the optical fiber 202A. A photo-detector (photo-detector) 301 receives leakage lights from the bend 300 and converts them into an electric signal. An amplifier 304 amplifies the electric signal. A demodulator 305 is an FM demodulator which FM-demodulates the electric signal into a voice signal originated by the optical transceiver 201. The voice signal is amplified by an amplifier 306. The amplified signal is converted into voice by an earphone 307 or a speaker 308.

The local unit 203 has a vibrator 302, which may be an audio speaker. Vibration on a cone sheet of the speaker directly vibrates the optical fiber 202A. Accordingly, the transmitter side of the local unit 203 only includes a microphone 311 and a driver 312.

A method of identifying a target optical fiber will be explained.

To identify a target optical fiber, any one of the arrangements of FIGS. 14 and 15 is employed. Ends of the optical fibers 202A and 202B, one of which is the target optical fiber, are connected to each other through the optical connector 204 or the optical delay unit 205, to form a loop. The local unit 203 is installed at a work site, and the vibrator 302 is attached to one of the optical fibers contained in the cable 202. The bender 303 forms a bend 300 on the optical fiber.

The optical connectors 215A and 215B of the optical transceiver 201 are connected to the optical fibers 202A and 202B.

In the optical transceiver 201, the power stabilizer 217 drives the light source 211 to emit a pulse laser light of constant power. The splitter-coupler 212 splits the light and makes the split lights incident to the optical fibers 202A and 202B, respectively, so that the split lights are propagated clockwise and counterclockwise, respectively, through the loop of the optical fibers 202A and 202B. At this time, the microphone 311 of the local unit 203 provides a sound signal, e.g., a 1-kHz sine wave. According to the sound signal, the vibrator 302 vibrates the optical fibers contained in the cable 202 one after another.

In the optical transceiver 201, the splitter-coupler 212 couples the oppositely propagated lights so that they interfere with each other. The photo-detector 213 converts the interfering lights into an electric signal, and the amplifier 222 amplifies the electric signal. The amplified signal is transferred to the demodulator 223.

The 1-kHz vibration signal applied by the vibrator 302 to the optical-fiber loop is audible. Therefore, if the electric signal provided by the photo-detector 213 includes the vibration signal, the demodulator 223 reproduces the audible vibration signal so that one can hear the sound through the earphone 224 or speaker 225 and determine whether or not the optical fiber now being vibrated by the vibrator 302 of the local unit 203 is the target optical fiber.

It is effective to carry out the works of identifying the target optical fiber on the conditions of the test 3 set forth above.

Once the target optical fiber, i.e., one of the optical fibers 202A and 202B is identified, the optical-fiber loop that contains the target optical fiber is used to carry out a conversation between the optical transceiver 201 and the local unit 203. This will be explained.

The optical transceiver 201 and local unit 203 employ the microphones 220 and 311 for sending voice and the earphones 224 and 307 or the speakers 225 and 308 for reproducing the voice.

<Voice Transmission from Optical Transceiver 201 to Local Unit 203>

One at the optical transceiver 201 produces a voice to the microphone 220. The microphone 220 provides a corresponding voice signal and the amplifier 221 amplifies the voice signal. According to the amplified voice signal, the modulator 219 FM-modulates a pulse drive signal of the power stabilizer 217. According to the FM-modulated drive signal, the light source 211 emits a pulse light, which is split by the splitter-coupler 212. The split lights are made incident to the optical fibers 202A and 202B that form a loop. Although the FM-modulated optical pulse signal returns to the optical transceiver 201 through the loop, the voice entered to the microphone 220 is never reproduced by the optical transceiver 201 because the optical transceiver 201 incorporates no demodulator for FM-modulated signals.

The local unit 203 receives the split lights that are based on the FM-modulated optical pulse signal. The lights leak from the bend 300 and are received by the photo-detector 301, which converts them into an electric signal. The electric signal is amplified by the amplifier 304 and is supplied to the demodulator 305.

The electric signal provided by the photo-detector 301 is based on the FM-modulated optical pulse signal originated by the optical transceiver 201. Accordingly, the demodulator 305 FM-demodulates the electric signal to reproduce the original voice signal. The voice signal is amplified by the amplifier 306 and drives the earphone 307 or the speaker 308 that emits the original voice sent from the optical transceiver 201.

<Voice Transmission from Local Unit 203 to Optical Transceiver 201>

The optical transceiver 201 always emits usual optical pulse signals that are not FM-modulated to the optical fibers 202A and 202B. Under this state, one at the local unit 203 produces voice to the microphone 311.

The voice is converted by the microphone 311 into an electric signal, which is supplied to the driver 312. According to the electric signal, the driver 312 drives the vibrator 302. Namely, vibration corresponding to the voice is applied to the optical fiber 202A.

The vibration changes a phase difference between the lights oppositely propagated through the optical-fiber loop. The propagated lights are coupled together by the splitter-coupler 212 of the optical transceiver 201, to make the lights interfere with each other. The interfering lights are converted by the photo-detector 213 into an electric signal. This electric signal shows a change corresponding to the vibration applied by the local unit 203.

The electric signal from the photo-detector 213 is amplified by the amplifier 222, is AM-demodulated by the demodulator 223, and is played by the earphone 224 or the speaker 225 as the voice entered by the local unit 203.

In this way, each apparatus for identifying a target optical fiber of the present invention is capable of providing a communication function without cutting the optical fibers.

Instead of the optical delay unit 205 (FIG. 15), an optical delay unit 230 may be arranged in an optical path between the splitter-coupler 212 and the optical connector 215A, as indicated with a dotted line in FIG. 17.

Figure 20:
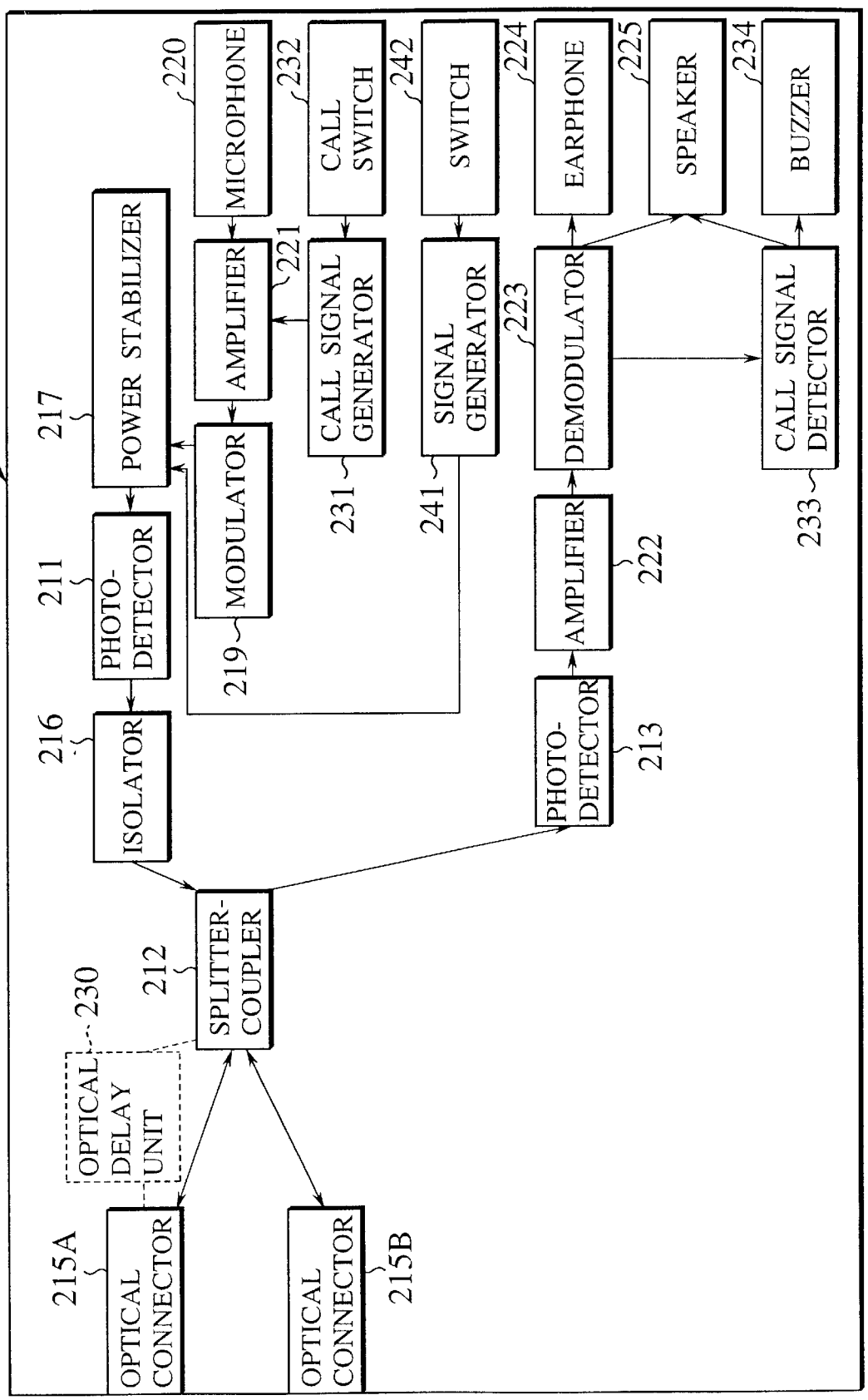
FIG. 20 is a block diagram showing an optical transceiver having a communication function applicable to the apparatuses of FIGS. 14 and 15.
Figure 21:
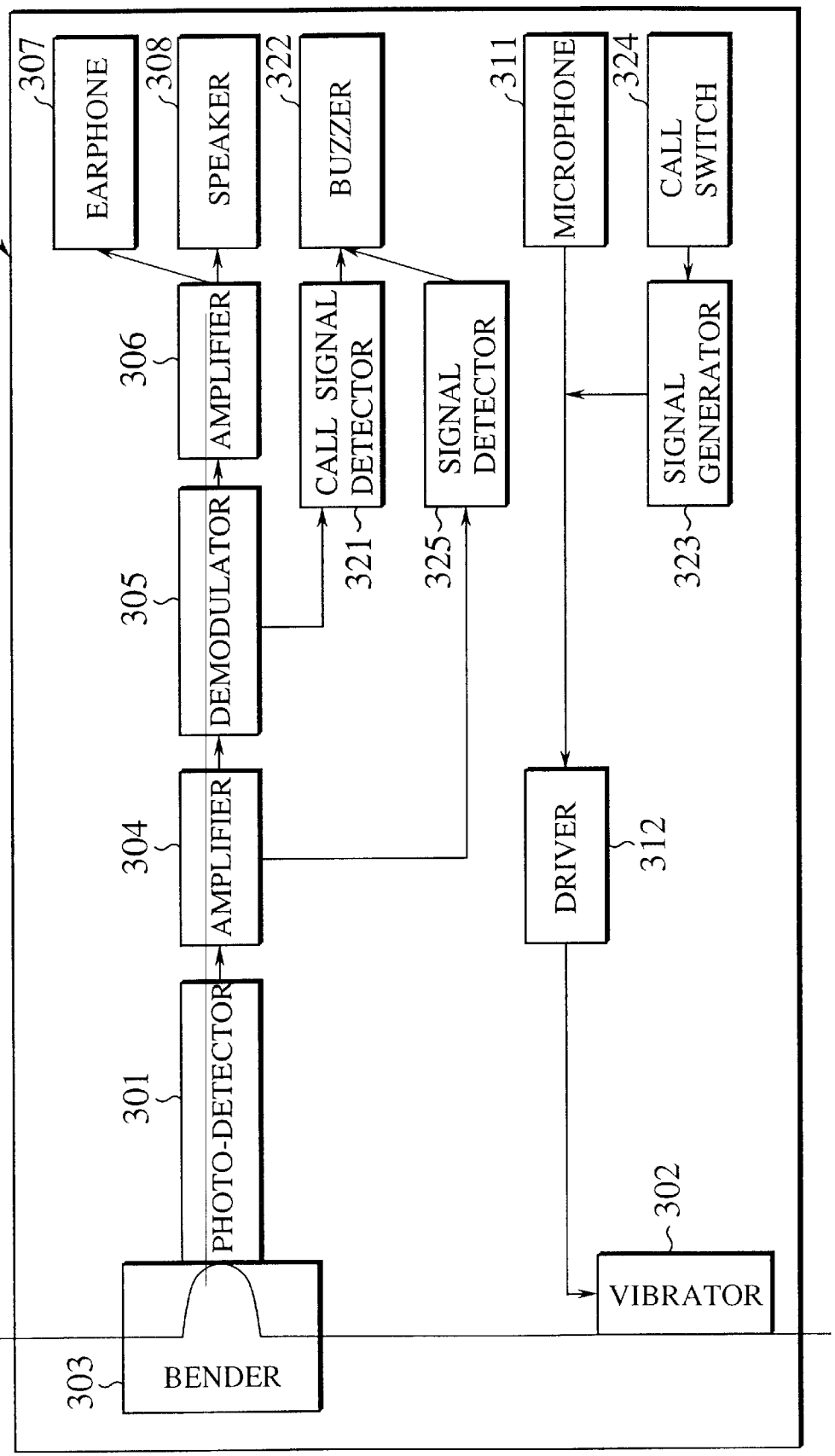
FIG. 21 is a block diagram showing a local unit having a communication function applicable to the apparatuses of FIGS. 14 and 15.

FIG. 20 is a block diagram showing an optical transceiver having a communication function applicable to the apparatuses of FIGS. 14 and 15, and FIG. 21 is a block diagram showing a local unit having a communication function applicable to the same apparatuses. In addition to the LI embodiments of FIGS. 17 and 19, the embodiments of FIGS. 20 and 21 have a call function.

In FIG. 20, the optical transceiver 201 additionally has a call signal generator 231 and a call switch (SW) 232 on the transmission side thereof. The output of the call signal generator 231 is supplied to an amplifier 221. The reception side of the optical transceiver 201 additionally has a call signal detector 233 and a buzzer 234. The call signal detector 233 receives the output of a demodulator 223 and drives the buzzer 234. The output of the call signal detector 233 may be supplied to a speaker 225.

The transmission side also has a signal generator 241 for generating a signal used to identify a target optical fiber, and a switch (SW) 242. The output of the signal generator 241 is supplied to a power stabilizer 217 that drives a light source 211. The other parts of the optical transceiver 201 are the same as those of the optical a transceiver 201 of FIG. 17.

In FIG. 21, the reception side of the local unit 203 additionally has a call signal detector 321 and a buzzer 322. The call signal detector 321 receives the output of an amplifier 306 and drives the buzzer 322. The transmission side of the local unit 203 additionally has a call signal generator 323 and a call switch (SW) 324. The output of the call signal generator 323 is supplied to a driver 312 that provides a vibration signal to drive a vibrator 302. The reception side of the local unit 203 also has a detector 325 for detecting the signal used to identify a target optical fiber. The detector 325 receives the output of an amplifier 304 and drives the buzzer 322. The other parts of the local unit 203 are the same as those of the local unit 203 of FIG. 19.

The apparatus employing the optical transceiver 201 of FIG. 20 and the local unit 203 of FIG. 21 first identifies a target optical fiber to be used to carry out a conversation. More precisely, the switch 242 of the optical transceiver 201 is manipulated to make the signal generator 241 generate a modulation signal (a rectangular wave of 270 Hz) to AM modulate a pulse drive signal provided by the power stabilizer 217. The AM-modulated drive signal drives the light source 211 to emit a pulse light. The light is split by a splitter-coupler 212, and the split lights are supplied to optical fibers 202A and 202B.

In the local unit 203, leakage lights from a bend 300 of the optical fiber 202A are received by a photo-detector 301, which converts them into an electric signal. The electric signal is amplified by the amplifier 304. The output of the amplifier 304 is supplied to a demodulator 305 and the detector 325. Since the demodulator 305 demodulates only FM signals, it never responds to the AM signal for identifying the target optical fiber. On the other hand, the detector 325 detects the amplified AM signal of 270Hz and demodulates the same to drive the buzzer 322. Hearing the sound from the buzzer 322, one at the local unit 203 recognizes that the optical fiber 202A is the target optical fiber.

Once the local unit 203 identifies the target optical fiber, a conversation is achievable between the optical transceiver 201 and the local unit 203 without cutting the optical fiber. To start a conversation from the local unit 203, the call switch 324 is manipulated. Then, the call signal generator 323 generates a call signal of predetermined frequency, according to which the vibrator 302 vibrates the optical fiber 202A, to change a phase difference between the lights oppositely propagated through the loop of the optical fibers 202A and 202B.

The propagated lights are received by the optical transceiver 201. A photo-detector 213 converts the lights into an electric signal, and a demodulator 223 AM-demodulates the electric signal. The call signal detector 233 detects the call signal in the demodulated signal and drives the buzzer 234 or speaker 225 so that one at the optical transceiver 201 may recognize the call from the local unit 203.

Thereafter, a conversation is carried out between the optical transceiver 201 and the local unit 203 through the optical-fiber loop without cutting the loop as explained with reference to FIGS. 17 and 19.

A call from the optical transceiver 201 to the local unit 203 will be explained. The call switch 232 is manipulated to make the call signal generator 231 generate a call signal of predetermined frequency. The call signal is amplified by an amplifier 221. According to the amplified call signal, a modulator 219 FM-modulates a pulse drive signal provided by the power stabilizer 217. According to the modulated signal, the light source 211 emits an optical pulse light. The light is split by the splitter-coupler 212, and the split lights are transferred to the local unit 203 through the optical fibers 202A and 202B.

In the local unit 203, leakage lights from the bend 300 of the optical fiber 202A are received by the photo-detector 301, which converts them into an electric signal. The electric signal is amplified by the amplifier 304. The output of the amplifier 304 is supplied to the demodulator 305 and detector 325. Since the signal originated by the optical transceiver 201 this time is FM-modulated, the signal detector 325 never responds to it, and the demodulator 305 demodulates it into the call signal. The call signal is amplified by the amplifier 306. The call signal detector 321 detects the call signal and drives the buzzer 322. Hearing the sound from the buzzer 322, one at the local unit 203 recognizes the call from the optical transceiver 201.

Thereafter, a conversation is carried out between the optical transceiver 201 and the local unit 203 through the optical-fiber loop without cutting the loop as explained with reference to FIGS. 17 and 19.

The local unit 203 may have an optical power meter so that the local unit 203 can provide all functions needed for optical work, such as carrying out a conversation, identifying a target optical fiber, and measuring optical power. This is convenient because equipment to be carried among work sites is only the local unit.

Although the embodiments install the local unit on one of the two optical fibers that form a loop, the local unit may be installed on both the two optical fibers. The latter installation is effective when two optical fibers are taped up and are unable to separate from each other so that they must simultaneously be vibrated and bent.

Two optical fibers that form a loop according to the present invention are each preferably a single mode fiber (SMF). Multimode optical fibers are employable if they are short or if detectors of good S/N ratio are employed. A light source for the present invention is preferably a laser diode. If multimode optical fibers are employed, the light source may be an LED. A DFB laser of high interference is preferred as a light source for the present invention when long optical fibers are employed or when detectors of poor S/N ratio are employed.

Two optical fibers to form a loop may be contained in the same cable, or in different cables, or in cables laid in different routes.

Instead of using the connector 107 to connect ends of two optical fibers to each other, the ends may be fused together or may be connected to each other by V-groove connection. Instead of using a vibrator to vibrate a part of a loop of optical fibers, one may apply a physical change such as a shock to the loop by hitting a part of the loop or a part of a cable that contains a part of the loop. This may cause a phase shift between lights oppositely propagated through the loop so that one at the optical transceiver may hear the hitting sound from a speaker or observe a corresponding waveform on an oscilloscope, to identify a target optical fiber cable or a target optical fiber.

What is claimed is:
1. A method of identifying a target optical fiber cable among many, comprising the steps of:

connecting each end of a plurality of optical fibers to each other to form a loop having two open ends;

connecting an optical transceiver to the open ends of the loop;

emitting a light from a light source of the optical transceiver;

splitting the light by a splitter-coupler of the optical transceiver;

making the split lights incident to the open ends of the loop, respectively, so that the split lights are oppositely propagated through the loop;

coupling the oppositely propagated lights so that they interfere with each other;

converting the interfering lights by a photo-detector of the optical transceiver into an electric signal that indicates the intensity of the interfering lights and is responsive to a change in the phase difference between the lights; and detecting in the electric signal a physical change applied to the target optical fiber cable that contains at least a part of the loop, to identify the target optical fiber cable.

2. A method of identifying a target optical fiber cable among many according to claim 1, vibration is applied to the target optical cable as the physical change.

3. A method of identifying a target optical fiber cable among many according to claims, an optical delay unit is inserted to a portion of the loop.

4. A method of identifying a target optical fiber among many, comprising the steps of:

connecting each end of a plurality of optical fibers including the target optical fiber to each other to form a loop having two open ends;

connecting an optical transceiver to the open ends of the loop;

emitting a light from a light source of the optical transceiver;

splitting the light by a splitter-coupler of the optical transceiver;

making the split lights incident to the open ends of the loop, respectively, so that the split lights are oppositely propagated through the loop;

coupling the oppositely propagated lights so that they interfere with each other;

converting the interfering lights by a photo-detector of the optical transceiver into an electric signal that indicates the intensity of the interfering lights and is responsive to a change in the phase difference between the lights; and detecting in the electric signal a physical change applied to the loop to identify the target optical fiber.

5. A method of identifying a target optical fiber among many according to claim 4, vibration is applied to the loop as the physical change.

6. A method of identifying a target optical fiber among many according to claim 4, an optical delay unit is inserted to a portion of the loop.

* * * * *